United States Patent
Yanagihara

(10) Patent No.: US 12,295,274 B2
(45) Date of Patent: May 13, 2025

(54) TRACTOR

(71) Applicant: KUBOTA CORPORATION, Osaka (JP)

(72) Inventor: Katsumi Yanagihara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 522 days.

(21) Appl. No.: 17/780,947

(22) PCT Filed: Sep. 4, 2020

(86) PCT No.: PCT/JP2020/033620
§ 371 (c)(1),
(2) Date: May 27, 2022

(87) PCT Pub. No.: WO2021/131168
PCT Pub. Date: Jul. 1, 2021

(65) Prior Publication Data
US 2023/0000002 A1    Jan. 5, 2023

(30) Foreign Application Priority Data
Dec. 27, 2019 (JP) .................................. 2019-239059

(51) Int. Cl.
*A01B 59/043* (2006.01)
*A01B 61/02* (2006.01)

(52) U.S. Cl.
CPC ............ *A01B 59/043* (2013.01); *A01B 61/02* (2013.01)

(58) Field of Classification Search
CPC ...... A01B 59/042; A01B 59/043; A01B 61/02
See application file for complete search history.

(56) References Cited

U.S. PATENT DOCUMENTS 2,967,575 A * 1/1961 Du Shane et al. . A01B 63/1006
172/302
3,083,777 A * 4/1963 Maughan ............ A01B 63/1117
172/9

(Continued)

FOREIGN PATENT DOCUMENTS

JP     02-219503 A    9/1990
JP     2003-219708 A    8/2003

(Continued)

OTHER PUBLICATIONS

Official Communication issued in corresponding Indian Patent Application No. 202217030193, mailed on Sep. 28, 2022.

(Continued)

*Primary Examiner* — Tara Mayo
(74) *Attorney, Agent, or Firm* — Keating & Bennett, LLP

(57) ABSTRACT

A tractor includes a three-point link mechanism to which a work apparatus is to be attached so as to be able to move upward and downward, a hydraulic drive to perform a swing operation to swing the three-point link mechanism, a load receiver to swing in response to a tow load being applied from the work apparatus when the work apparatus performs ground work while being towed by the vehicle body, and a link mechanism to transmit an amount of operation for the swing operation to the hydraulic drive according to an amount of swing of the load receiver. The link mechanism includes, at a most upstream position, an interlocking swing arm to swing in conjunction with the swing of the load receiver about a swing axis that is different from a swing axis of the load receiver, the load receiver includes a first portion to press the interlocking swing arm that includes a second portion contactable with the first portion so to be pressed by the first portion, and a contact position of the first and second portions.

6 Claims, 13 Drawing Sheets

(56) References Cited

U.S. PATENT DOCUMENTS

| | | | | |
|---|---|---|---|---|
| 3,181,288 A * | 5/1965 | Halls | ................ | A01D 34/03 |
| | | | | 172/450 |
| 3,194,319 A * | 7/1965 | Faure | ............ | A01B 63/1117 |
| | | | | 172/9 |
| 4,393,942 A * | 7/1983 | Mijot et al. | ........ | A01B 63/1006 |
| | | | | 172/445 |
| 4,508,178 A * | 4/1985 | Cowell et al. | ....... | A01B 63/114 |
| | | | | 172/7 |
| 4,582,141 A * | 4/1986 | van der Lely | ........ | E02F 9/2253 |
| | | | | 172/3 |
| 4,762,182 A * | 8/1988 | Reimann | .............. | A01B 49/025 |
| | | | | 172/443 |
| 5,601,146 A * | 2/1997 | Schlegel et al. | ..... | A01B 59/068 |
| | | | | 172/450 |
| 2015/0041228 A1 | 2/2015 | Hatanaka et al. | | |

FOREIGN PATENT DOCUMENTS

| | | |
|---|---|---|
| JP | 2017-063686 A | 4/2017 |
| WO | 2013132678 A1 | 9/2013 |
| WO | 2018/052056 A1 | 3/2018 |

OTHER PUBLICATIONS

Official Communication issued in International Patent Application No. PCT/JP2020/033620, mailed on Nov. 24, 2020.

\* cited by examiner

TRACTOR

BACKGROUND OF THE INVENTION

1. Field of the Invention

The present invention relates to a tractor that is provided with a three-point link mechanism to which a work apparatus is to be attached so as to be able to move upward and downward.

2. Description of the Related Art

For example, the tractor disclosed in JP 2018-042530A is provided with a three-point link mechanism, and the three-point link mechanism is operated by a hydraulic unit (the "hydraulic lifting/lowering device" in JP 2018-042530A) so as to swing. The work apparatus is able to move upward and downward according to a tow load when the work apparatus is attached to the three-point link mechanism and is towed by the vehicle body to perform ground work. A load receiving section (the "load detection member" in JP 2018-042530A) that receives the tow load from the work apparatus is provided, and the load receiving section swings in response to the tow load from the work apparatus, and transmits an amount of operation for swinging the three-point link mechanism, to the hydraulic unit via the link mechanism. Also, an interlocking swing arm (the "swing member" in JP 2018-042530A) that can swing in conjunction with the load receiving section is provided. When the load receiving section swings by a predetermined amount or more, the interlocking swing arm swings, the amount of swing of the load receiving section is amplified by the interlocking swing arm, and the operation sensitivity of the three-point link mechanism is improved.

SUMMARY OF THE INVENTION

In the tractor disclosed in JP 2018-042530A, the interlocking swing arm does not swing unless the load receiving section swings by the predetermined amount or more. That is to say, the operation sensitivity of the three-point link mechanism is not improved unless the tow load reaches an amount that is no less than the predetermined amount. Therefore, there is room for improvement in improving the operation sensitivity.

Preferred embodiments of the present invention provide tractors each capable of performing control to lift and lower a work apparatus with high sensitivity in response to a tow load.

A tractor according to a preferred embodiment of the present invention includes a three-point link mechanism that is coupled to a rear portion of a vehicle body so as to be able to swing upward and downward, and to which a work apparatus is to be attached so as to be able to move upward and downward, a hydraulic drive to perform a swing operation to swing the three-point link mechanism, a load receiver to swing in response to a tow load being applied from the work apparatus when the work apparatus performs ground work while being towed by the vehicle body, and a link mechanism to transmit an amount of operation for the swing operation to the hydraulic drive according to an amount of swing of the load receiver, wherein the link mechanism includes, at a most upstream position, an interlocking swing arm to swing in conjunction with the swing of the load receiver, about a swing axis that is different from a swing axis of the load receiver, the load receiver includes a first portion to press the interlocking swing arm that includes a second portion contactable with the first portion so as to be pressed by the first portion, and a contact position of the first and second portions is changeable.

According to a preferred embodiment of the present invention, the load receiver and the interlocking swing arm respectively swing about different swing axes, and the contact position of the first and second portions is changeable. Therefore, the link mechanism can amplify the amount of swing of the load receiver by changing the contact position. Also, the interlocking swing arm is provided at the most upstream position in the link mechanism, and therefore the interlocking swing arm starts swinging when the load receiver starts swinging. In this state, the contact position of the first and second portions can be changed. Therefore, the link mechanism can amplify the amount of swing of the load receiver from when the load receiver starts swinging. Therefore, the operation sensitivity of the three-point link mechanism is improved compared to a configuration in which the interlocking swing arm does not swing unless the load receiver swings by a predetermined amount or more. Thus, it is possible to realize a tractor capable of performing control to move a work apparatus upward and downward with high sensitivity according to the tow load.

In a preferred embodiment of the present invention, it is preferable that one of the first and second portions includes a swing, the other of the first and second portions includes a lock including a plurality of recessed portions to receive and lock the swing, and the swing is provided with a swing angle determiner to determine a swing angle when the swing is fitted into any of the plurality of recessed portions.

With this configuration, the combination of the first and second portions includes the swing and the lock, and the swing fits into a recessed portion of the lock. Also, when the swing fits into one of the plurality of recessed portions, the swing angle of the swing is fixed by the swing angle determiner. Therefore, the contact position of the first and second portions is held without being displaced unintentionally. Thus, the interlocking swing arm can more desirably amplify the amount of swing of the load receiver.

In a preferred embodiment of the present invention, it is preferable that the swing angle determiner is operable to position the swing at an angle that is orthogonal to a swing angle of the load receiver.

With this configuration, the angle at which the swing can be positioned includes an angle that is orthogonal to the swing angle of the load receiver. That is to say, the swing range of the swing is set so as to be a range that is close to the angle that is orthogonal to the swing angle of the load receiver. Therefore, the swing can reliably receive the reaction force from the lock. As a result, the swing can desirably press the lock. Note that the "orthogonal angle" referred to in the description of preferred embodiments of the present invention is not limited to a strict orthogonal angle, but may be a substantially orthogonal angle.

In a preferred embodiment of the present invention, it is preferable that a free end of the swing is provided with a pin to be fitted into any of the plurality of recessed portions, the lock is provided with a common recess that includes a plurality of recessed portions so that the plurality of recessed portions are continuously lined up, and the pin is movable to a position over the common recess and to be fitted into one of the plurality of recessed portions.

With this configuration, a plurality of recessed portions are provided in the common recess, and the pin of the swing fits into the plurality of recessed portions. Also, the pin is movable over the common recess to be fitted into one of the plurality of recessed portions, and therefore the common recess includes gaps between the pin and the plurality of recessed portions. Therefore, it is possible to realize a configuration with which the pin swings between the gaps in the common recess when the operator changes the swing angle of the swing, and it is further easier to perform the operation to change the swing angle.

In a preferred embodiment of the present invention, it is preferable that the link mechanism is provided with a sensitivity adjuster operable such that, as the load receiver swings toward a side where the tow load is larger, an amount of displacement of a mechanism that is located downstream thereof in the link mechanism increases.

The amount of swing of the load receiver increases as the tow load applied to the work apparatus increases. It is preferable that, when the tow load applied to the work apparatus increases, the work apparatus is actively controlled so as to move upward in order to reduce the tow load. With this configuration, as the amount of swing of the load receiver increases, the amount of displacement of a mechanism that is located downstream thereof in the link mechanism increases. As a result, the work apparatus is actively controlled so as to move upward, the tow load is quickly reduced, and damage to the work apparatus and engine stall due to an increase in the tow load can be desirably prevented.

In a preferred embodiment of the present invention, it is preferable that the link mechanism includes, at a position that is downstream of the interlocking swing arm, a link ratio adjuster to change a link ratio so that a link ratio change rate is smaller than a link ratio change rate of the first and second portions.

With this configuration, it is possible to finely adjust the amount of operation for the hydraulic drive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. Note that the direction indicated by the arrow "F" in FIG. 1 indicates forward in the travel direction of the tractor, and the direction indicated by the arrow "U" indicates upward of the tractor. In addition, the description "left" and the description "right" in the present specification respectively mean the right and the left when viewed forward in the travel direction of the tractor.

Figure 1:
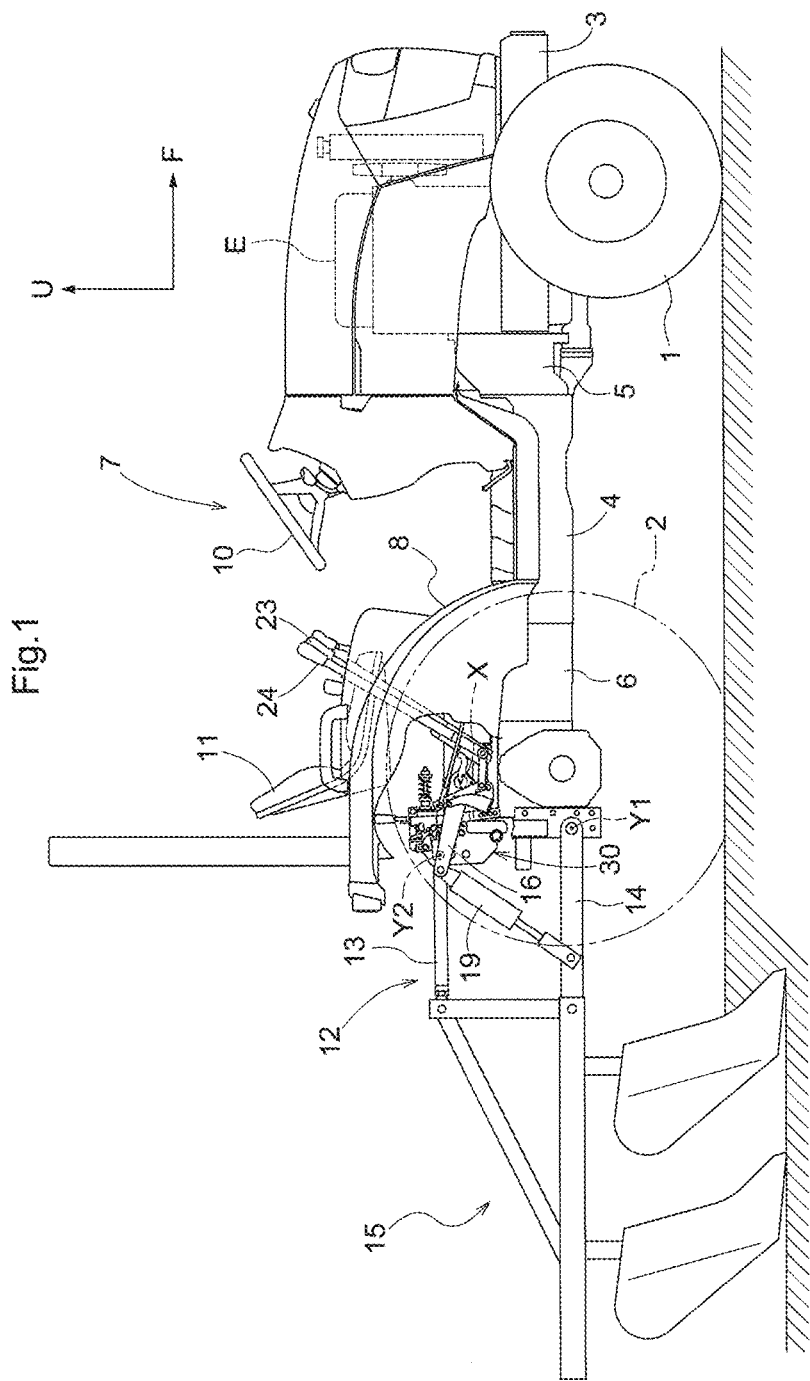
FIG. 1 is a right side view of a tractor to which a work apparatus is attached.
Figure 2:
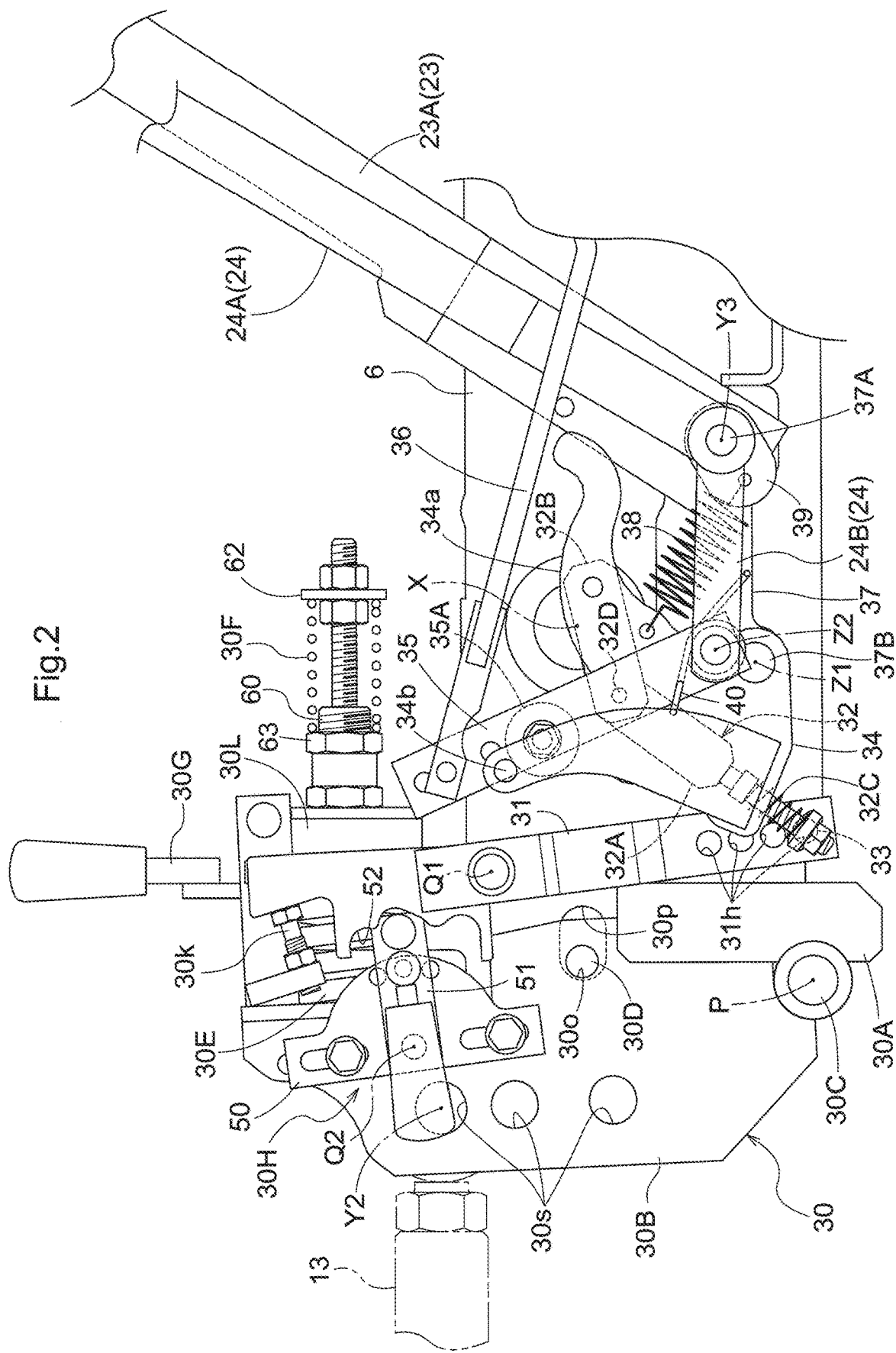
FIG. 2 is a right side view showing a draft control mechanism.
Figure 3:
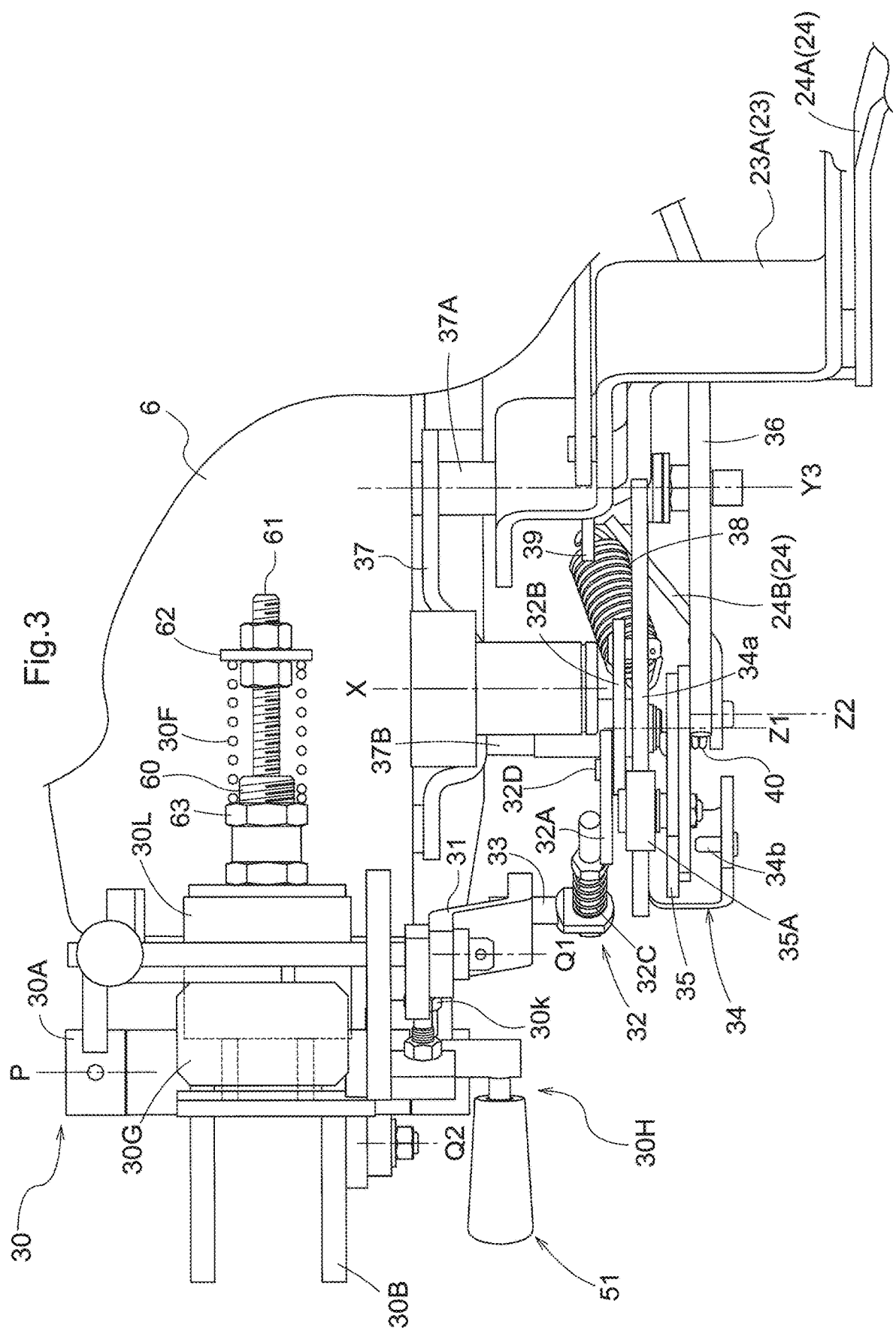
FIG. 3 is a plan view showing the draft control mechanism.
Figure 4:
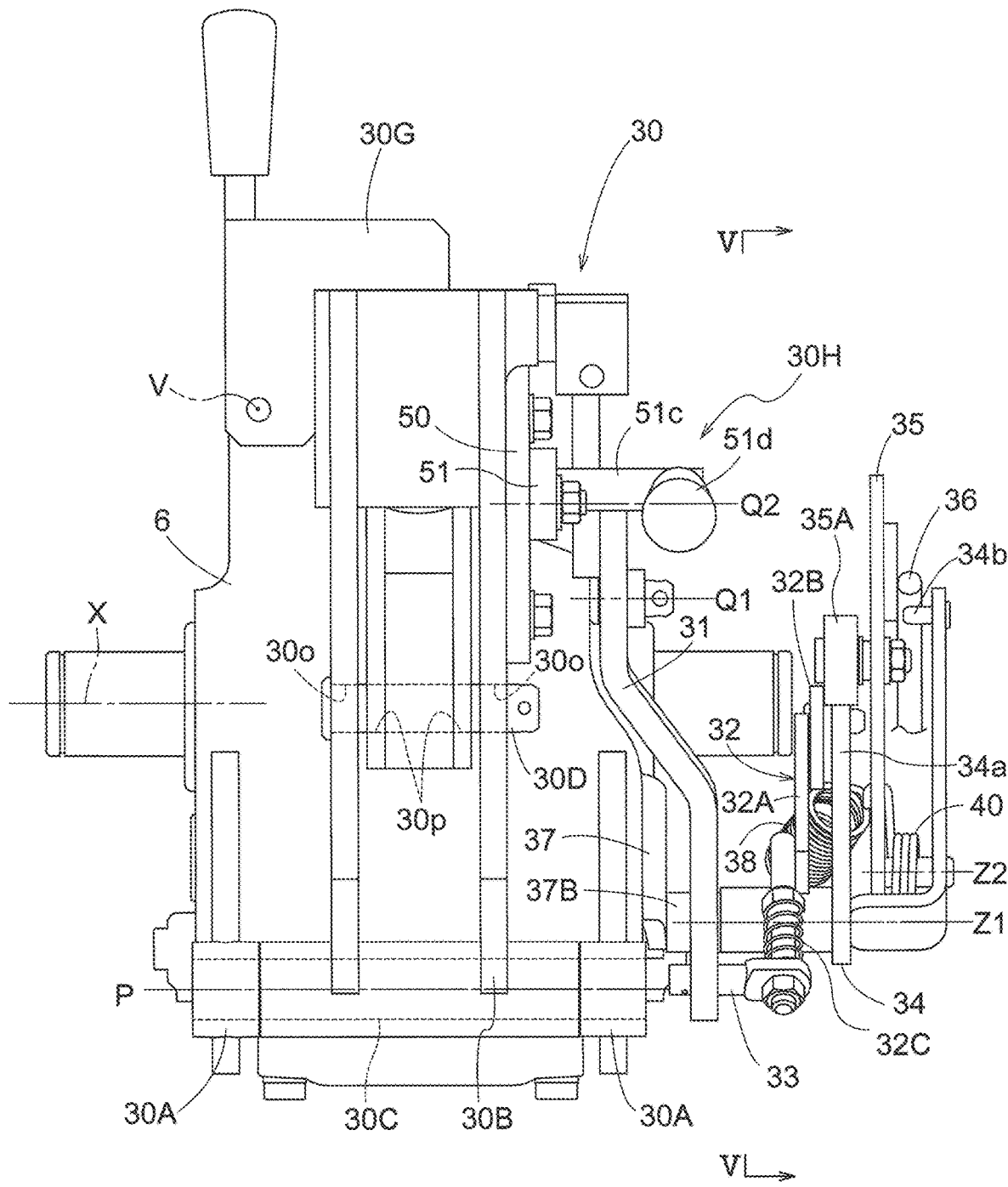
FIG. 4 is a rear view showing the draft control mechanism.
Figure 5:
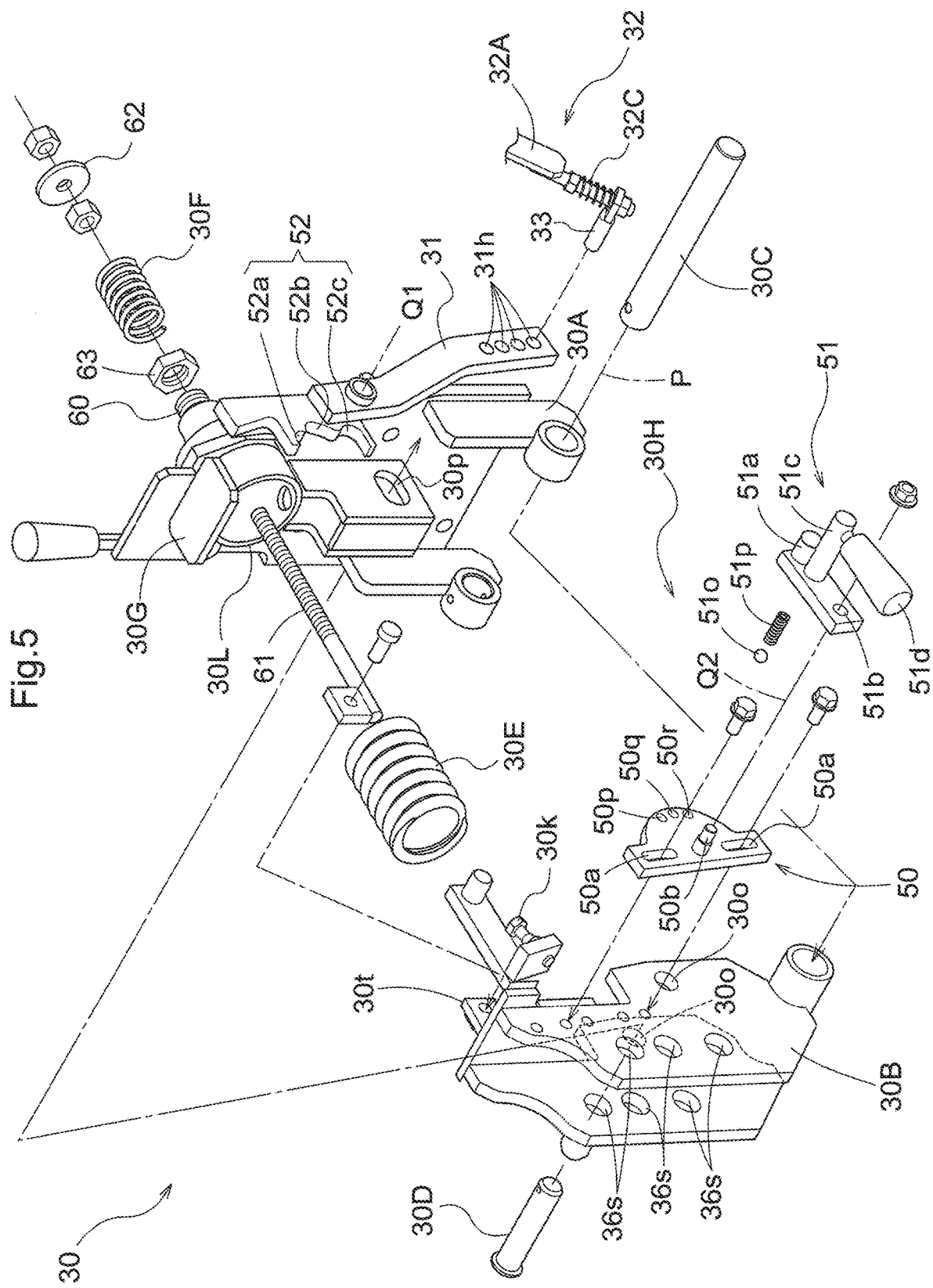
FIG. 5 is an exploded perspective view showing assembly of a load receiving section and an interlocking swing mechanism.

The tractor shown in FIG. 1 is provided with a pair of left and right front wheels 1, a pair of left and right rear wheels 2, a front frame 3, an intermediate frame 4, a clutch housing 5, a transmission case 6, a driver's part 7, and a pair of left and right rear fenders 8.

The pair of left and right front wheels 1 are pivotally supported by the front frame 3 provided in a front portion of the vehicle body, and are located at laterally outer positions of the front frame 3 with respect to the machine body. The intermediate frame 4 is provided rearward of the front frame 3. The clutch housing 5 is provided between the front frame 3 and the intermediate frame 4, and the front frame 3 and the intermediate frame 4 are each coupled to the clutch housing 5. The transmission case 6 is coupled to a rear end portion of the intermediate frame 4. The clutch housing 5 and the transmission case 6 are also used as vehicle body frames of the tractor. That is to say, the front frame 3, the intermediate frame 4, the clutch housing 5, and the transmission case 6 are provided as vehicle body frames of the tractor.

An engine E is mounted on, and supported by, a rear portion of the front frame 3, and the clutch housing 5 is coupled to a lower rear end portion of the engine E. The pair of left and right rear wheels 2 are pivotally supported by the transmission case 6 so as to be located outside the transmission case 6 in a left-right direction.

Although not shown, a main clutch and so on are built into the clutch housing 5. The intermediate frame 4 is provided with a transmission shaft. A main transmission device, an auxiliary transmission device, and so on are built into the transmission case 6. The power of the engine E is transmitted to the pair of left and right front wheels 1 and the pair of left and right rear wheels 2 via the main clutch, the transmission shaft, the main transmission device, the auxiliary transmission device, and so on.

The driver's part 7 is provided in a rear portion of the vehicle body, and is configured to allow an operator to ride. The driver's part 7 is provided with a steering wheel 10 and a driver's seat 11. The operator can sit on the driver's seat 11. The steering wheel 10 is provided forward of the driver's seat 11, and the operator steers the pair of left and right front wheels 1 by manually operating the steering wheel 10. The rear fenders 8 are respectively provided on the left and right sides of the driver's seat 11 with respect to the machine body, and the rear fenders 8 cover the left and right rear wheels 2 from above. The transmission case 6 is provided below the driver's seat 11. The driver's seat 11 is located between the pair of left and right rear wheels 2 in a plan view and in a front-rear view.

A three-point link mechanism 12 is coupled to a rear portion of the transmission case 6 so as to be able to swing upward and downward, and the three-point link mechanism 12 is capable of attaching a work apparatus 15 thereto. The work apparatus 15 shown in FIG. 1 is a plow. Note that the work apparatus 15 may be, for example, a rotary tillage device, a disc harrow, a cultivator, a subsoiler, or the like.

The three-point link mechanism 12 includes a single top link 13, and left and right lower links 14. The lower links 14 are coupled to a lower rear portion of the transmission case 6 so as to be able to swing about a swing axis Y1. A load receiving section 30 is coupled to an upper rear portion of the transmission case 6, and the top link 13 is coupled to the load receiving section 30 so as to be able to swing about a swing axis Y2. The load receiving section 30 will be described later.

The three-point link mechanism 12 is driven by lift arms 16 of a hydraulic driven type so as to move upward and downward. Specifically, end portions of link members 19 are pivotally coupled to leading end portions of the lift arms 16 with pins, respectively, and the opposite end portions of the link members 19 are pivotally coupled to the lower links 14 with pins, respectively.

Each lift arm 16 is able to swing upward and downward about a swing axis X, based on the driving of a hydraulic actuator (not shown). The lower links 14 swing upward and downward as the lift arms 16 swing upward and downward. The top link 13 coupled to the work apparatus 15 also swings in conjunction with the up-down swing of the lower links 14. The work apparatus 15 is coupled to the top link 13 and the lower links 14 so as to be able to swing relative to the top link 13 and the lower links 14. The work apparatus 15 moves upward and downward in conjunction with the up-down swing of the top link 13 and the lower links 14.

In response to the operator operating a height setting lever 23, the hydraulic oil is supplied to and discharged from the hydraulic actuator, the lift arms 16 swing, and the work apparatus 15 moves upward and downward. The supply and discharge of hydraulic oil is controlled through the operation of a spool (not shown). A feedback link mechanism (not shown) operates in conjunction with the up-down movement of the work apparatus 15. The feedback link mechanism adjusts the amount of hydraulic oil to be supplied to, or discharged from, the hydraulic actuator, based on the amount of operation of the height setting lever 23 and the swing angle of the lift arms 16. When the work apparatus 15 reaches a control target height, the supply and discharge of hydraulic oil to and from the hydraulic actuator is stopped, and the up-down swing of the left and right lift arms 16 is stopped. In this way, the work apparatus 15 is attached to the three-point link mechanism 12 so as to be able to move upward and downward. The hydraulic actuator and the spool described in the present preferred embodiment are equivalent to the "hydraulic drive". That is to say, a hydraulic drive configured to operate to swing the three-point link mechanism 12 is provided.

In the present preferred embodiment, the height at which the work apparatus 15 works is adjustable based on the work load and the tillage depth when the work apparatus 15 performs ground work. For example, if a plow is coupled to the three-point link mechanism 12 as the work apparatus 15, the plow receives a reaction force from the ground when ground work with the plow is performed, and this reaction force acts as a tow load. If the tow load is too large, the plow may be damaged or the engine E may stall. Therefore, the tractor according to the present preferred embodiment is provided with a mechanism to move the work apparatus 15 such as a plow upward and downward according to the tow load to adjust the tow load to be constant, i.e., a draft control mechanism. Hereinafter, the draft control mechanism will be described.

As shown in FIGS. 2 to 6, the draft mechanism includes the load receiving section 30 and the link mechanism (an interlocking swing arm 31, a coupling link part 32, a tillage depth adjustment cam 34, an interlocking swing part 35, and a linkage rod 36). In order to make the load receiving section 30 and the link mechanism as the draft mechanism more visible, FIGS. 2 to 4 do not show the lift arms 16, but the swing axis X of the lift arms 16 is shown in the drawings.

The load receiving section 30 swings according to the tow load from the work apparatus 15 when the work apparatus 15 performs ground work while being towed by the vehicle body of the tractor. The link mechanism transmits the amount of operation for swinging the three-point link mechanism 12, to the hydraulic drive (including the above-described hydraulic actuator and spool (not shown)) according to the amount of swing of the load receiving section 30. The interlocking swing arm 31, the coupling link part 32, the tillage depth adjustment cam 34, the interlocking swing part 35, and the linkage rod 36 are provided as the link mechanism according to a preferred embodiment of the present invention.

The load receiving section 30 is provided with a bracket 30A, a receiving member 30B, a fulcrum pin 30C, a linkage pin 30D, a first coil spring 30E, a second coil spring 30F, and a swing prohibiting member 30G. The bracket 30A is coupled and fixed to a rear portion of the transmission case 6. The top link 13 is coupled to the receiving member 30B.

Round holes capable of inserting the fulcrum pin 30C therethrough are respectively located in a lower portion of the bracket 30A and a lower portion of the receiving member 30B in a lateral direction with respect to the machine body, and the fulcrum pin 30C penetrates through the round holes in the respective lower portions of the bracket 30A and the receiving member 30B in a lateral direction with respect to the machine body. That is to say, the fulcrum pin 30C pivotally couples the bracket 30A and the receiving member 30B so as to swing about a swing axis P relative to each other, and the receiving member 30B is able to swing forward and rearward about the swing axis P that extends in a lateral direction with respect to the machine body.

A round hole 30*o* is drilled along a lateral direction with respect to the machine body in a central portion of the receiving member 30B in the vertical direction. In addition, an elongated hole 30*p* is drilled along a lateral direction with respect to the machine body in a central portion of the bracket 30A in the vertical direction. The lengthwise direction of the elongated hole 30*p* coincides with the front-rear direction of the machine body. The linkage pin 30D penetrates through the round hole 30*o* in the central portion of the receiving member 30B in the vertical direction and the elongated hole 30*p*. The two end portions of the linkage pin 30D in the lengthwise direction thereof are located outside the receiving member 30B. Then, a snap pin is locked to an end portion of the linkage pin 30D in the lengthwise direction thereof, and the linkage pin 30D is prevented from coming loose from the bracket 30A and the receiving member 30B.

The linkage pin 30D cannot be displaced relative to the round hole 30*o*, and is slidable in the lengthwise direction of the elongated hole 30*p*. Therefore, the receiving member 30B can swing forward and rearward within the range of the elongated hole 30*p* in the lengthwise direction thereof.

A housing cylinder 30L is located in an upper portion of the bracket 30A. The housing cylinder 30L preferably has a cylindrical shape that extends in the front-rear direction of the machine body, for example. The first coil spring 30E is housed in the housing cylinder 30L (see FIG. 10). A gap is provided between an upper portion of the bracket 30A and an upper portion of the receiving member 30B. The first coil spring 30E is provided in this gap, and the two ends of the first coil spring 30E in the expanding direction thereof respectively abut against the bracket 30A and the receiving member 30B. The receiving member 30B is biased by the first coil spring 30E so as to swing rearward.

The second coil spring 30F is provided at a position opposite to the first coil spring 30E with respect to the bracket 30A. The elastic modulus of the second coil spring 30F is smaller than the elastic modulus of the first coil spring 30E. When the first coil spring 30E expands and the elastic energy of the first coil spring 30E is released, the second coil spring 30F contracts and the elastic energy of the second coil spring 30F increases. The details will be described later.

Three upper and lower attachment holes 30s are located in a rear portion of the bracket 30A, and one end portion of the top link 13 is connected to one of the plurality of attachment holes 30s so as to be able to swing upward and downward about a pin. The attachment hole 30s coupled to the top link 13 of the three upper and lower attachment holes 30s defines and functions as the swing axis Y2 of the top link 13.

The end portion of the top link 13 opposite to the end portion coupled to the bracket 30A is coupled to an upper portion of the work apparatus 15. Therefore, a tensile force acts from the work apparatus 15 to the top link 13 in a state where the work apparatus 15 is lifted or in a state where the work apparatus 15 is not performing ground work. Also, in such a state, a tensile force acts from the top link 13 to the receiving member 30B, and the receiving member 30B swings to the rearmost position.

When a plow is coupled to the three-point link mechanism 12 as the work apparatus 15 and tillage work is performed using the plow, the larger the tillage depth is, the larger the reaction force from the ground that the plow receives is. This reaction force is the tow load, and the upward component of the reaction force acts on the top link 13 as a pressing force. This pressing force is transmitted to the receiving member 30B via the top link 13. When this pressing force is larger than the resultant force of the respective elastic forces of the first coil spring 30E and the second coil spring 30F, the receiving member 30B swings forward resisting the resultant force of the respective elastic forces of the first coil spring 30E and the second coil spring 30F.

When the receiving member 30B swings forward, the first coil spring 30E contracts. The elastic force of the first coil spring 30E increases in proportion to the amount of contraction of the first coil spring 30E. Therefore, the forward swing of the receiving member 30B stops at a swing angle at which the pressing force acting on the receiving member 30B due to the tow load of the work apparatus 15 and the resultant force of the elastic forces of the first coil spring 30E and the second coil spring 30F are balanced. For this reason, as the tow load caused due to the ground work performed by the work apparatus 15 increases, the pressing force acting on the receiving member 30B increases, and the receiving member 30B swings to a more forward position. Thus, the receiving member 30B is able to detect the tow load of the work apparatus 15.

The swing prohibiting member 30G prohibits the receiving member 30B from swinging. Although not described in detail, the swing prohibiting member 30G is able to swing about a swing axis V (see FIG. 4) that extends in the front-rear direction, provided in an upper left portion of the bracket 30A. A handle is provided on an upper portion of the swing prohibiting member 30G. A horizontal plate portion that can be interposed in a region between the upper end portion of the bracket 30A and the upper end portion of the receiving member 30B is provided between the swing axis V and the handle. In response to the operator operating the handle to the left and the right, the horizontal plate portion swings upward and downward. In a state where the receiving member 30B has swung to the rearmost position, if the swing prohibiting member 30G swings in the clockwise direction shown in FIG. 4, the horizontal plate portion is interposed so as to fill the entire gap between the upper end portion of the bracket 30A and the upper end portion of the receiving member 30B, and restricts the receiving member 30B from swinging forward. As a result, the receiving member 30B is not able to swing. If the swing prohibiting member 30G swings in the counterclockwise direction shown in FIG. 4, the horizontal plate portion is separated from the region between the upper end portion of the bracket 30A and the upper end portion of the receiving member 30B so that the receiving member 30B is able to swing forward and rearward.

The load receiving section 30 is provided with an amplification adjustment section 30H. In addition, the interlocking swing arm 31 is pivotally coupled to the bracket 30A with a pin so as to be able to swing forward and rearward. The interlocking swing arm 31 is provided at the most upstream position in the link mechanism. The interlocking swing arm 31 is coupled to a right side portion of the bracket 30A so as to be able to swing forward and rearward about a swing axis Q1 that extends in a lateral direction with respect to the machine body. The amplification adjustment section 30H is fixed to a right side portion of the receiving member 30B with a bolt. The interlocking swing arm 31 swings about the swing axis Q1 that is different from the swing axis P of the load receiving section 30, in conjunction with the swing of the load receiving section 30.

The amplification adjustment section 30H swings integrally with the receiving member 30B, and when the receiving member 30B swings forward, the interlocking swing arm 31 and the amplification adjustment section 30H abut against each other, and the interlocking swing arm 31 swings. The interlocking swing arm 31 is able to amplify the amount of swing of the receiving member 30B by swinging by a larger degree than the front-rear swing of the receiving member 30B. The details will be described later. In addition, the amplification adjustment section 30H is able to adjust the amount of swing of the interlocking swing arm 31. The details will be described later.

An abutting bolt 30k is coupled to an upper front portion of the receiving member 30B with respect to the amplification adjustment section 30H. In a state where the receiving member 30B has swung to the rearmost position, the abutting bolt 30k and the interlocking swing arm 31 abut against each other, and the interlocking swing arm 31 and the amplification adjustment section 30H are separated from each other. In response to the receiving member 30B swinging forward, the interlocking swing arm 31 swings about the swing axis Q1 while the abutting bolt 30k and the interlocking swing arm 31 abut against each other. At this time, the more the receiving member 30B swings forward, the smaller the separation distance between the interlocking swing arm 31 and the amplification adjustment section 30H is. Thereafter, when the receiving member 30B swings further forward and the interlocking swing arm 31 and the amplification adjustment section 30H abut against each other, the abutting bolt 30k and the interlocking swing arm 31 are separated from each other.

As described above, the lift arms 16 (see FIG. 1, hereinafter the same applies) swings upward and downward due to hydraulic oil being supplied to or discharged from the hydraulic actuator, and the supply and discharge of hydraulic oil is controlled through the operation of a spool (not shown). The coupling link part 32, the tillage depth adjustment cam 34, the interlocking swing part 35, and the linkage rod 36 are included in the link mechanism to transmit the swing operation of the receiving member 30B to the spool.

As shown in FIGS. 2 to 6, one end portion of the coupling link part 32 is pivotally coupled to a lower end portion of the interlocking swing arm 31 with a pin member 33 so as to be able to swing relative to the swing arm 31, and the tillage depth adjustment cam 34 is pivotally coupled to the other end portion of the coupling link part 32 with a pin so as to be able to swing relative to the coupling link part 32. A support member 37 is coupled to a right side portion of the transmission case 6, and two cylinder members 37A and 37B protrude from the support member 37 in lateral directions with respect to the machine body. The tillage depth adjustment cam 34 is supported by the cylinder member 37B so as to be able to swing forward and rearward about a swing axis Z1 that extends in a lateral direction with respect to the machine body.

Figure 6:
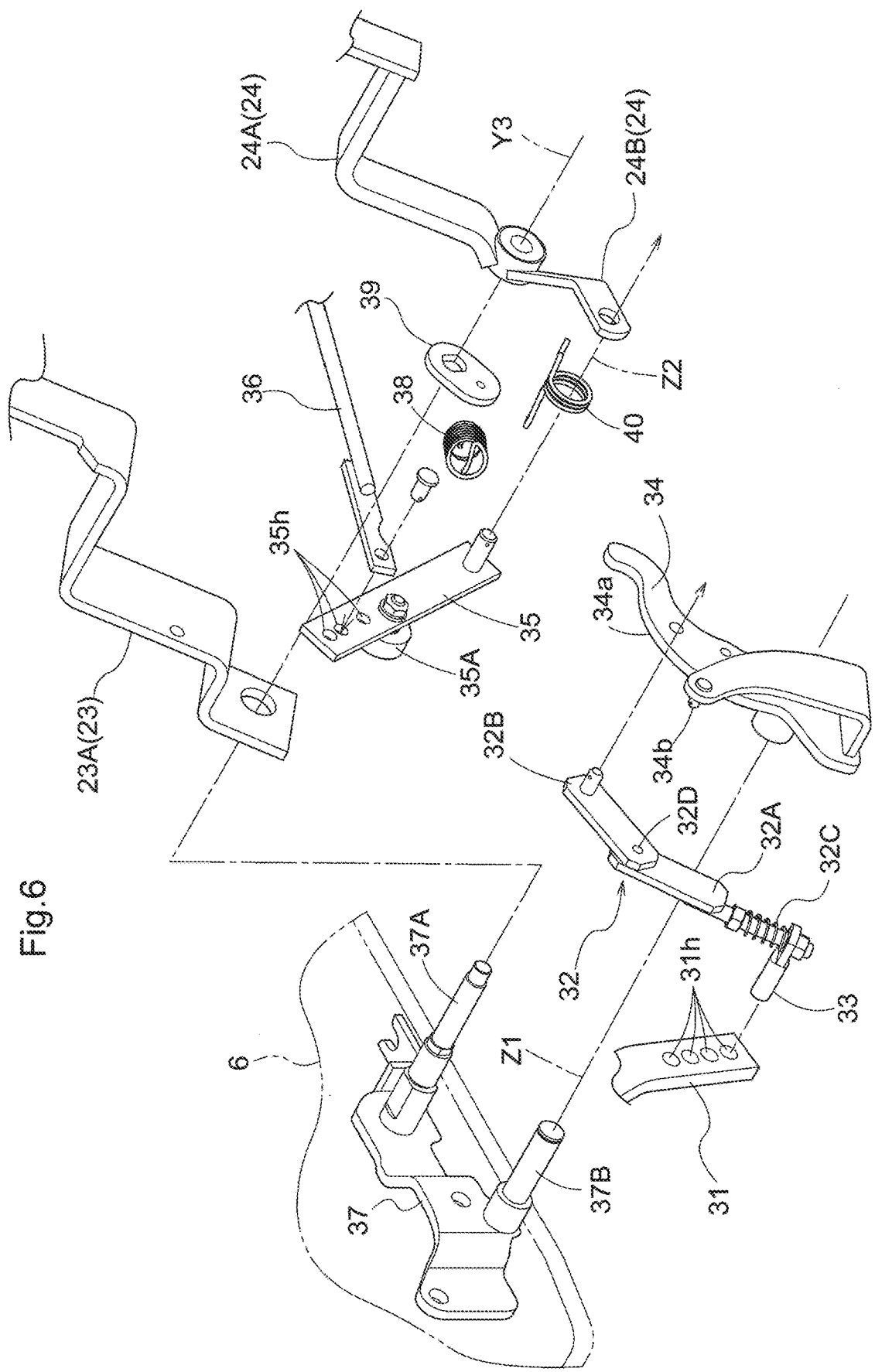
FIG. 6 is an exploded perspective view of assembly of a link mechanism.
Figure 7:
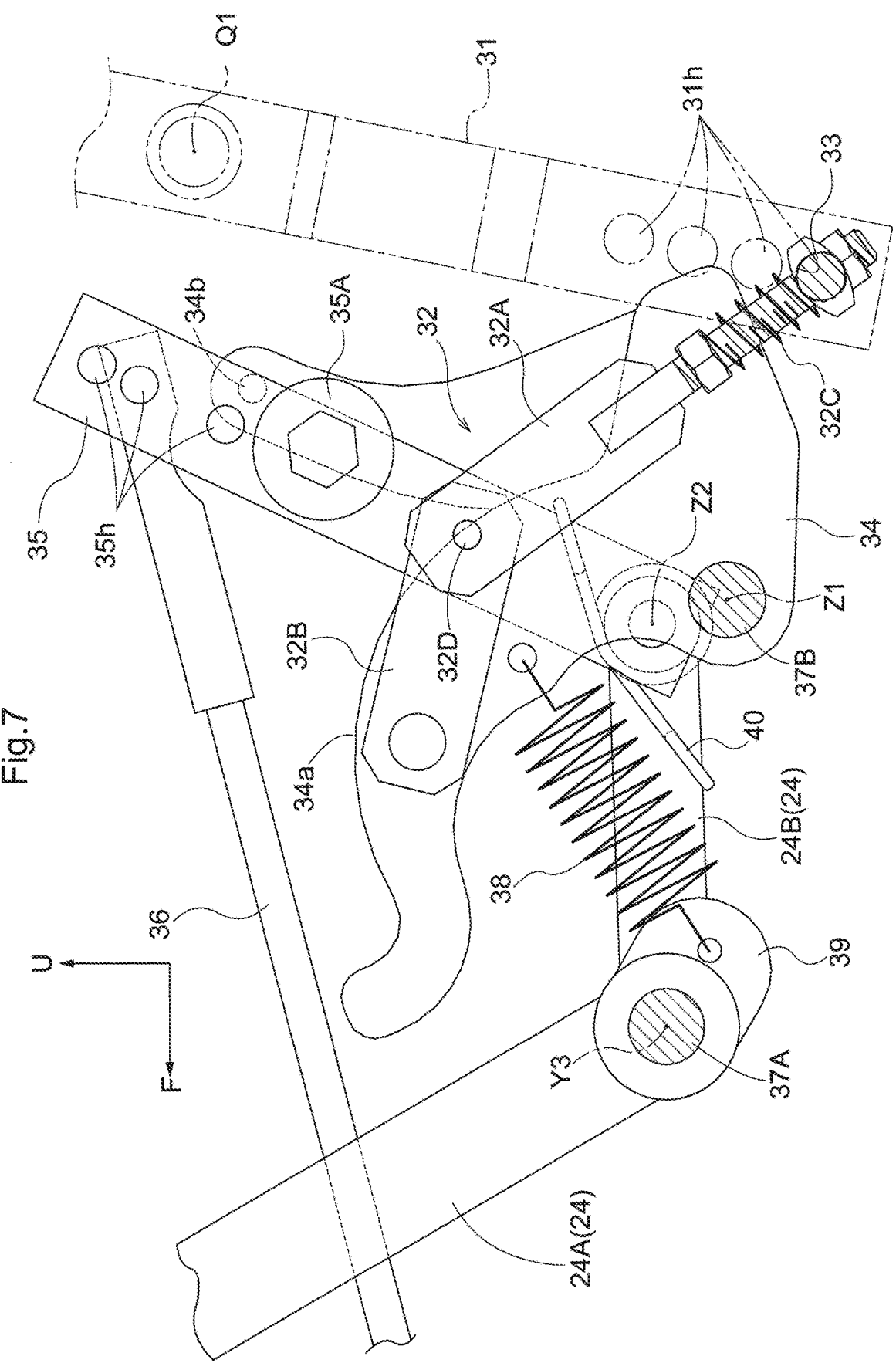
FIG. 7 is a cross-sectional view taken along a V-V line in FIG. 4, showing the link mechanism.
Figure 8:
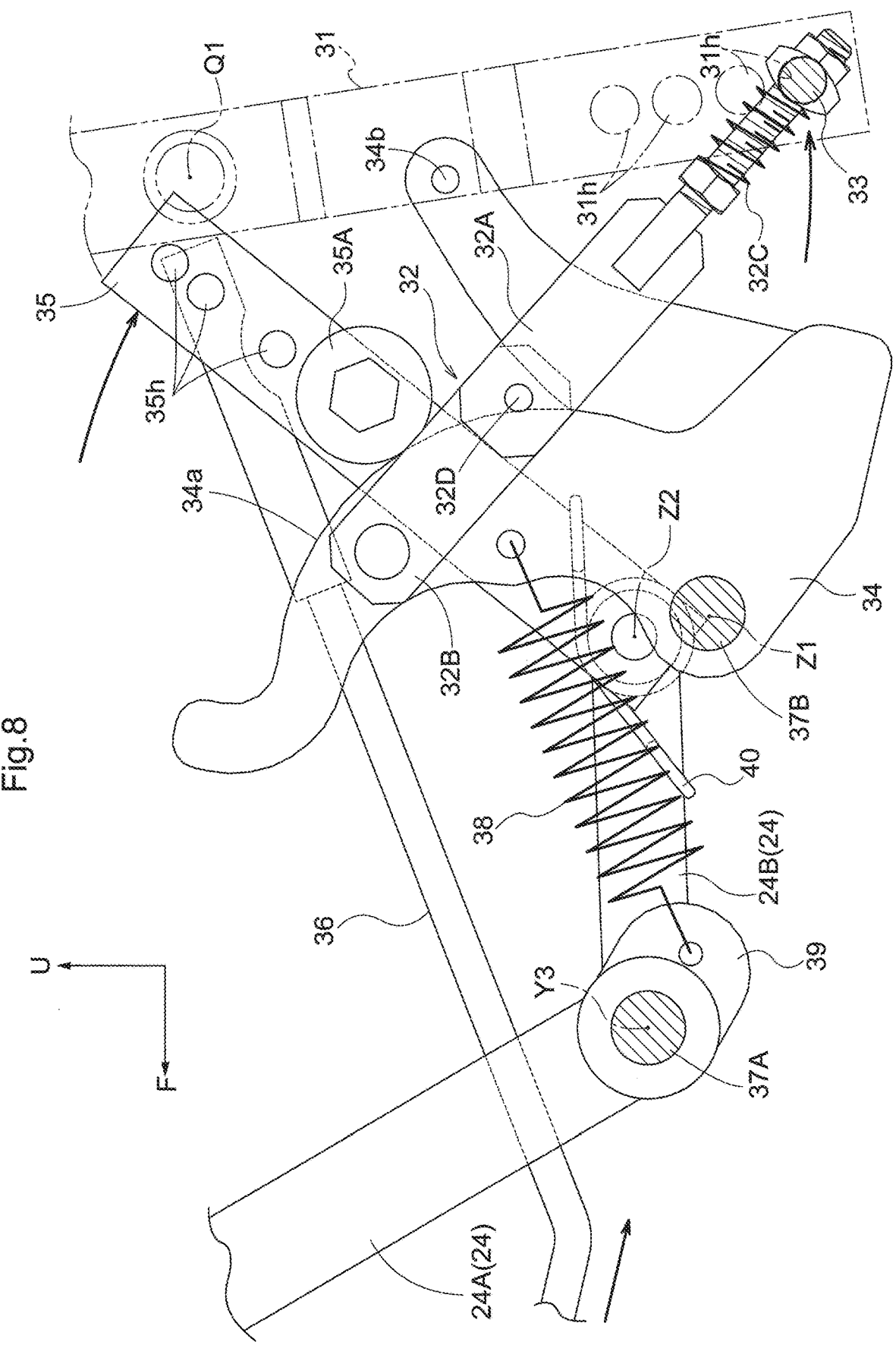
FIG. 8 is a cross-sectional view taken along the V-V line in FIG. 4, showing movement of the link mechanism in comparison with FIG. 7.

As shown in FIGS. 6 to 8, the coupling link part 32 includes a first link member 32A, a second link member 32B, a coil spring member 32C, and a conjunction pin 32D. The first link member 32A is formed by welding a flat plate member and a bolt member to each other. End portions of the flat plate member and the bolt member in the lengthwise direction thereof are coupled to each other by welding. The end portion of the flat plate member of the first link member 32A opposite to the end portion welded to the bolt member is pivotally coupled to the second link member 32B with the conjunction pin 32D so as to be able to swing relative to the second link member 32B. The second link member 32B is a flat plate member. The end portion of the second link member 32B opposite to the end portion pivotally coupled to the first link member 32A is pivotally coupled to the tillage depth adjustment cam 34 so as to be able to swing relative to the tillage depth adjustment cam 34.

A pair of nuts are locked to upper and lower end regions of the bolt member of the first link member 32A, and the coil spring member 32C and the pin member 33 are fitted onto the region between the pair of nuts. The coil spring member 32C is provided upward of the pin member 33, i.e., on the second link member 32B side. The pin member 33 is fitted onto the bolt member of the first link member 32A, and is inserted through one of a plurality of insertion holes 31h in a lower end portion of the interlocking swing arm 31, and is fastened with a snap pin so as not to come loose from the insertion hole 31h. That is to say, the lower end portion of the bolt member of the first link member 32A and the lower end portion of the interlocking swing arm 31 are coupled to each other with the pin member 33 so as to be able to swing.

One end portion of a tension spring 38 is hooked on the tillage depth adjustment cam 34, and the other end portion of the tension spring 38 is hooked on a hook member 39. The hook member 39 is supported by the cylinder member 37A. The cylinder member 37A is located forward of the tillage depth adjustment cam 34 with respect to the machine body, and the tension spring 38 tensions the tillage depth adjustment cam 34 and the cylinder member 37A. Therefore, the tillage depth adjustment cam 34 is biased so as to swing forward. Note that a lower end portion of a swing arm 23A of the height setting lever 23 and a lower end portion of a swing arm 24A of a tillage lever 24 are fitted onto the cylinder member 37A. The lengthwise direction of the cylinder member 37A extends along a swing axis Y3 that extends in a lateral direction with respect to the machine body. The lower end portion of the swing arm 23A and the lower end portion of the swing arm 24A are swing base end portions. That is to say, the height setting lever 23 and the tillage lever 24 is able to swing forward and rearward about the swing axis Y3.

The tillage depth adjustment cam 34 is provided with a cam portion 34a. A roller 35A is provided in a central region of the interlocking swing part 35 in the lengthwise direction thereof, and the cam portion 34a and the roller 35A is able to abut against each other. The cam portion 34a is inclined so as to be separated from the swing axis Z1 in a forward direction. Therefore, when a front region of the cam portion 34a and the roller 35A abut against each other, the degree of swing of the interlocking swing part 35 is higher than when a rear region of the cam portion 34a and the roller 35A abut against each other. The tillage depth adjustment cam 34 is equivalent to the "sensitivity adjuster".

As shown in FIGS. 7 and 8, in response to the tillage depth adjustment cam 34 swinging rearward about the swing axis Z1 and the cam portion 34a and the roller 35A abutting against each other, the interlocking swing part 35 swings rearward while the roller 35A moves along the cam portion 34a. In response to the interlocking swing part 35 swinging rearward, the cam portion 34a and the roller 35A abut against each other on a front region of the cam portion 34a. Therefore, the amount of change in the swing angle of the interlocking swing part 35 becomes large relative to the amount of change in the swing angle of the tillage depth adjustment cam 34. That is to say, the tillage depth adjustment cam 34, which defines and functions as the sensitivity changing section, operates so that, as the load receiving section 30 swings to the side where tow load is larger, the amount of displacement of the mechanism that is located downstream thereof in the link mechanism increases.

The tillage depth adjustment cam 34 is provided with a coupling portion 34b for a control cable of a rotary tillage device, and one end portion of a control cable can be coupled to the coupling portion 34b. The control cable of the rotary tillage device is described in FIGS. 16 and 17 of JP 2018-042530A. The coupling portion 34b is located on the opposite side of the cam portion 34a with respect to the interlocking swing part 35. In automatic tillage depth control that is performed by the rotary, the coupling portion 34b is pulled via the control cable when a grounding body provided in the rotary tillage device swings upward and downward, and accordingly the tillage depth adjustment cam 34 swings forward and rearward. If a control cable is coupled to the coupling portion 34b, generally, the swing prohibiting member 30G is operated so as to swing downward, and the receiving member 30B is restricted from swinging forward. In this case, as shown in FIG. 7, the first link member 32A and the second link member 32B are configured to be flexible with the conjunction pin 32D being interposed therebetween, and therefore the tillage depth adjustment cam 34 is able to swing even when the receiving member 30B is not able to swing.

A plurality of insertion holes 35h are formed in a free end portion of the interlocking swing part 35, and a rear end portion of the linkage rod 36 is pivotally coupled to one of the plurality of insertion holes 35h with a pin. In response to the interlocking swing part 35 swinging rearward, the linkage rod 36 is displaced rearward. Although not shown in the drawings, the link mechanism that operates the spool for adjusting the supply/discharge amount of hydraulic oil is coupled to a front end portion of the linkage rod 36. In response to the linkage rod 36 being displaced rearward, the spool is operated and hydraulic oil is supplied to the hydraulic actuator, and the lift arms 16 swings upward.

The swing base end portion of the interlocking swing part 35 is pivotally coupled to a free end portion of a bracket 24B with a pin, so as to be able to swing, and the interlocking swing part 35 is able to swing forward and rearward about a swing axis Z2. At the position where the cylinder member 37A is located, the respective swing base end portions of the swing arm 24A and the bracket 24B are coupled to each other by welding. Also, the tillage depth adjustment cam 34 is able to abut against the swing arm 24A. In response to the tillage depth adjustment cam 34 swinging rearward, the cam portion 34a and the roller 35A approach each other, and it becomes easier for the interlocking swing part 35 to be operated so as to swing rearward. That is to say, in response to the tillage depth adjustment cam 34 being swung rearward, it becomes easier for the lift arms 16 to be operated so as to swing upward.

A torsion spring 40 is wound around a swinging portion of the interlocking swing part 35. The torsion spring 40 is locked to a downward portion of the swing base end portion of the interlocking swing part 35 and a downward portion of the free end portion of the bracket 24B. The interlocking swing part 35 is biased by the torsion spring 40 so as to swing forward.

In response to the receiving member 30B swinging forward by receiving a pressing force from the work apparatus 15, the interlocking swing arm 31 abuts against the abutting bolt 30k or the amplification adjustment section 30H, and the interlocking swing arm 31 swings clockwise in the side view in FIGS. 7 and 8. The coupling link part 32 is pulled rearward in conjunction with the swing of the interlocking swing arm 31. At this time, as shown in FIG. 8, the first link member 32A and the second link member 32B are pulled and extend straight, and therefore a tensile force is applied from the coupling link part 32 to the tillage depth adjustment cam 34. Thus, the coupling link part 32 is displaced rearward, and the tillage depth adjustment cam 34 swings rearward.

As the tillage depth adjustment cam 34 swings, the cam portion 34a and the roller 35A approach each other. When the cam portion 34a and the roller 35A abut against each other, the interlocking swing part 35 swings rearward while the roller 35A moves along the cam portion 34a. The linkage rod 36 coupled to the interlocking swing part 35 so as to be able to swing is pulled, and is displaced rearward. The above-described spool is moved so that hydraulic oil is supplied to the hydraulic actuator, the lift arms 16 swings upward in conjunction with the swing of the interlocking swing part 35, and the work apparatus 15 moves upward.

If the work apparatus 15 is a plow, the reaction force applied from the ground to the plow decreases as the position of the plow moves upward, and thus the pressing force acting from the plow to the receiving member 30B via the top link 13 also decreases. Thereafter, when the pressing force acting on the receiving member 30B and the elastic force of the first coil spring 30E are balanced, the swing of the receiving member 30B, the interlocking swing arm 31, the tillage depth adjustment cam 34, and the interlocking swing part 35 is stopped, and the linkage rod 36 is no longer displaced. Thereafter, the supply and discharge of hydraulic oil to and from the hydraulic actuator is stopped by the above-described feedback link mechanism operating the spool, and the up-down swing of the left and right lift arms 16 is stopped.

When the pressing force does not act on the receiving member 30B, the receiving member 30B stands still at the rearmost end of the front-rear swing range that is based on the front-rear length of the elongated hole 30p. At this time, the first link member 32A and the second link member 32B in the coupling link part 32 are loose, and therefore, even if the interlocking swing arm 31 swings, the tillage depth adjustment cam 34 does not move in conjunction with the swing of the interlocking swing arm 31. In addition, the coil spring member 32C is fitted onto the first link member 32A in the coupling link part 32. As a result, even if the receiving member 30B that has swung forward swings abruptly to the rearmost end position and the interlocking swing arm 31 also swings abruptly, the impact caused by such an abrupt swing is absorbed by the expansion and contraction operation of the coil spring member 32C. Therefore, it is possible to avoid the problem in that the tillage depth adjustment cam 34 and the interlocking swing part 35 unnecessarily swing due to the impact. At this time, the tillage depth adjustment cam 34 swings forward due to the elastic force of the tension spring 38. Also, the interlocking swing part 35 swings forward due to the elastic force of the torsion spring 40.

As described above, the interlocking swing arm 31 is able to amplify the amount of swing of the receiving member 30B. The amplification adjustment section 30H is fixed to the receiving member 30B with a bolt, and the amplification adjustment section 30H and the interlocking swing arm 31 are configured to be able to abut against each other.

The interlocking swing arm 31 extends in the top-bottom direction. If the abutting point of the amplification adjustment section 30H and the interlocking swing arm 31 is changed in the top-bottom direction, the amount of swing of the interlocking swing arm 31 changes even if the amount of swing of the receiving member 30B is the same. The amplification adjustment section 30H is able to adjust the abutting point against the interlocking swing arm 31 in the top-bottom direction.

As shown in FIGS. 9 to 13, the amplification adjustment section 30H is provided with a bracket member 50 and a swing member 51. Elongated holes 50a are located in an upper end portion and a lower end portion of a flat surface portion of the bracket member 50, and the pair of upper and lower elongated holes 50a extend in a top-bottom direction. Bolts are inserted into the pair of upper and lower elongated holes 50a. That is to say, the bracket member 50 is coupled to the receiving member 30B with a bolt so as to be able to adjust the position thereof in the top-bottom direction. A protruding cylinder portion 50b is provided on a region between the pair of upper and lower elongated holes 50a, and the protruding cylinder portion 50b protrudes to the side opposite to the side where the receiving member 30B is located. A thread groove engageable with a nut is located in a protruding leading end portion of the protruding cylinder portion 50b.

The swing member 51 is able to swing relative to the bracket member 50. A bolt insertion hole 51b is located in a swing base end portion of the swing member 51. The protruding cylinder portion 50b is inserted into the bolt insertion hole 51b, and a nut engages with the leading end portion of the protruding cylinder portion 50b. Thus, the swing member 51 is able to swing upward and downward about a swing axis Q2. The swing member 51 is equivalent to the "first portion". That is to say, the load receiving section 30 is provided with the swing member 51 that defines and functions as the first part that presses the interlocking swing arm 31.

A free end portion of the swing member 51 is provided with a fitting pin 51a. The fitting pin 51a preferably has a cylindrical shape that extends in a lateral direction with respect to the machine body, for example. The fitting pin 51a may be welded and fixed to the free end portion of the swing member 51, or coupled to the free end portion of the swing member 51 with a bolt. The fitting pin 51a is equivalent to the "pin".

The interlocking swing arm 31 is provided with the "second portion" that comes into contact with the swing member 51 defining and functioning as the first part, and is pressed by the swing member 51. In the present preferred embodiment, the second part is a locking part 52. The locking part 52 is provided with a plurality of recessed portions that can receive and lock the swing member 51. As the "plurality of recessed portions", a first recessed portion 52a, a second recessed portion 52b, and a third recessed portion 52c are provided in a portion that is upward of the swing axis Q1, of the interlocking swing arm 31, so as to be lined up in a top-bottom direction.

Among the first recessed portion 52a, the second recessed portion 52b, and the third recessed portion 52c, the first recessed portion 52a is the farthest from the swing axis Q1 and the third recessed portion 52c is the closest to the swing axis Q1. The first recessed portion 52a, the second recessed portion 52b, and the third recessed portion 52c are each curved in an arc shape in correspondence with the cylindrical fitting pin 51a. Thus, the first recessed portion 52a, the second recessed portion 52b, and the third recessed portion 52c are each able to receive and lock the fitting pin 51a. That is to say, the fitting pin 51a can be fitted into the first recessed portion 52a, the second recessed portion 52b, or the third recessed portion 52c.

A portion that is upward of the first recessed portion 52a and a portion that is downward of the third recessed portion 52c, of the interlocking swing arm 31, are respectively provided with a pair of upper and lower protruding portions 52d and 52e, and the pair of upper and lower protruding portions 52d and 52e protrude toward the swing member 51 more than the other portions of the interlocking swing arm 31. The fitting pin 51a is positioned between the pair of upper and lower protruding portions 52d and 52e, and the fitting pin 51a is able to swing about the swing axis Q2 within the top-bottom range between the pair of upper and lower protruding portions 52d and 52e. The first recessed portion 52a, the second recessed portion 52b, and the third recessed portion 52c are provided between the pair of upper and lower protruding portions 52d and 52e so as to be lined up in a top-bottom direction. The region surrounded by the pair of upper and lower protruding portions 52d and 52e, the first recessed portion 52a, the second recessed portion 52b, and the third recessed portion 52c like a cove is equivalent to the "common recess". That is to say, the locking part 52 is provided with a common recess that includes a plurality of recessed portions so that the plurality of recessed portions are continuously lined up. The fitting pin 51a is moved over the common recess and is fitted into one of the plurality of recessed portions.

The swing member 51 is able to switch between a state in which the fitting pin 51a and the first recessed portion 52a are able to engage with each other, a state in which the fitting pin 51a and the second recessed portion 52b are able to engage with each other, and a state in which the fitting pin 51a and the third recessed portion 52c are able to engage with each other, by swinging upward and downward. In this way, a configuration is provided so that the contact point of the swing member 51 defining and functioning as the first part and the locking part 52 defining and functioning as the second part can be changed.

The swing member 51 is provided with a "swing angle determiner" that determines the swing angle when the swing member 51 is fitted into one of the first recessed portion 52a, the second recessed portion 52b, and the third recessed portion 52c. The positioning mechanism according to the present preferred embodiment is a detent mechanism. The positioning mechanism is provided with a ball 51o, a coil spring member 51p, and detent recessed portions 50p, 50q, and 50r.

A handle arm 51c is coupled to a portion that is adjacent to the fitting pin 51a on the bolt insertion hole 51b side, of the swing member 51. The handle arm 51c protrudes to the side opposite to the side where the receiving member 30B is located. A handle 51d is coupled rearward to a protruding leading end portion of the handle arm 51c.

Figure 9:
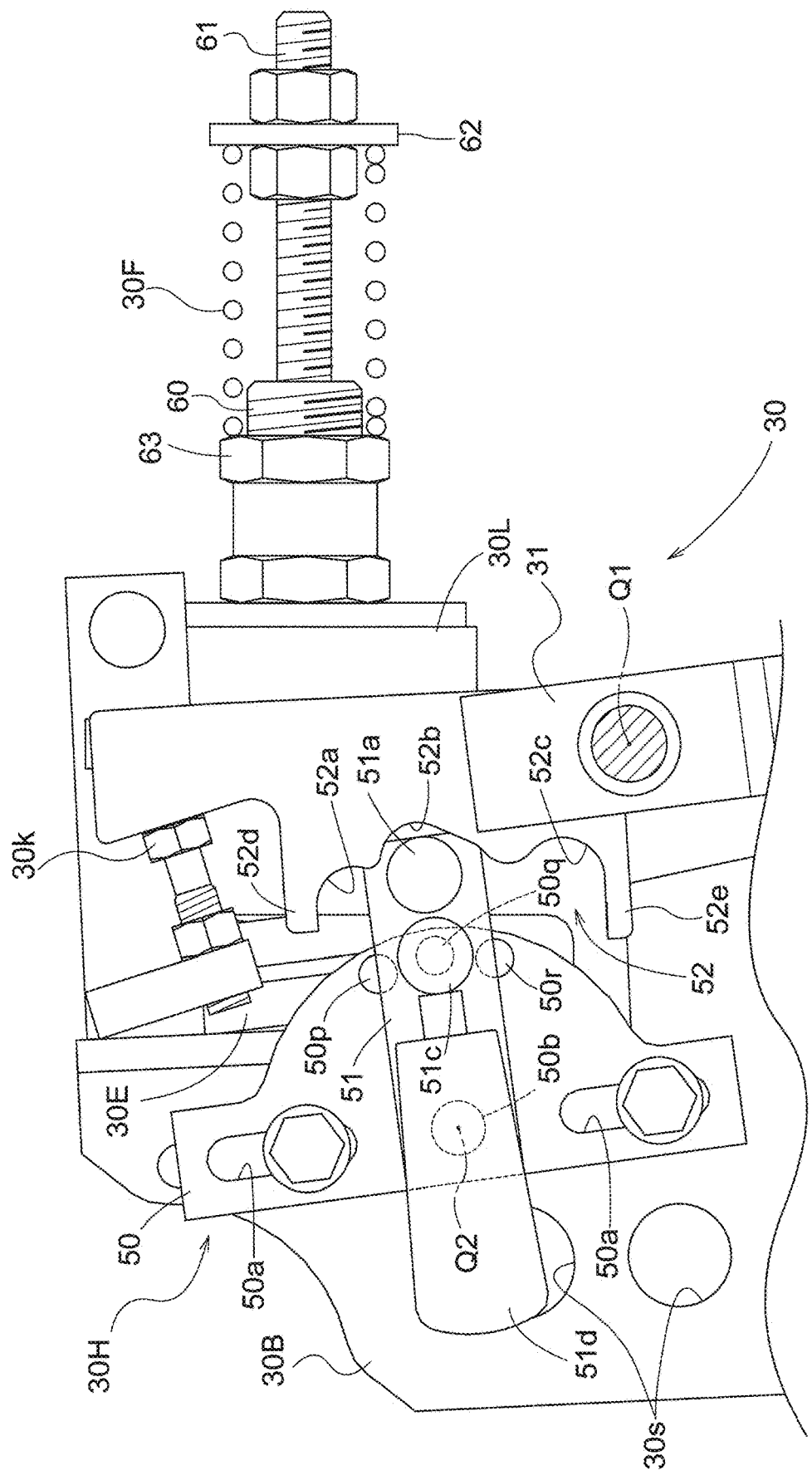
FIG. 9 is an enlarged side view showing a swing member (a first part) and a locking part (a second part).
Figure 10:
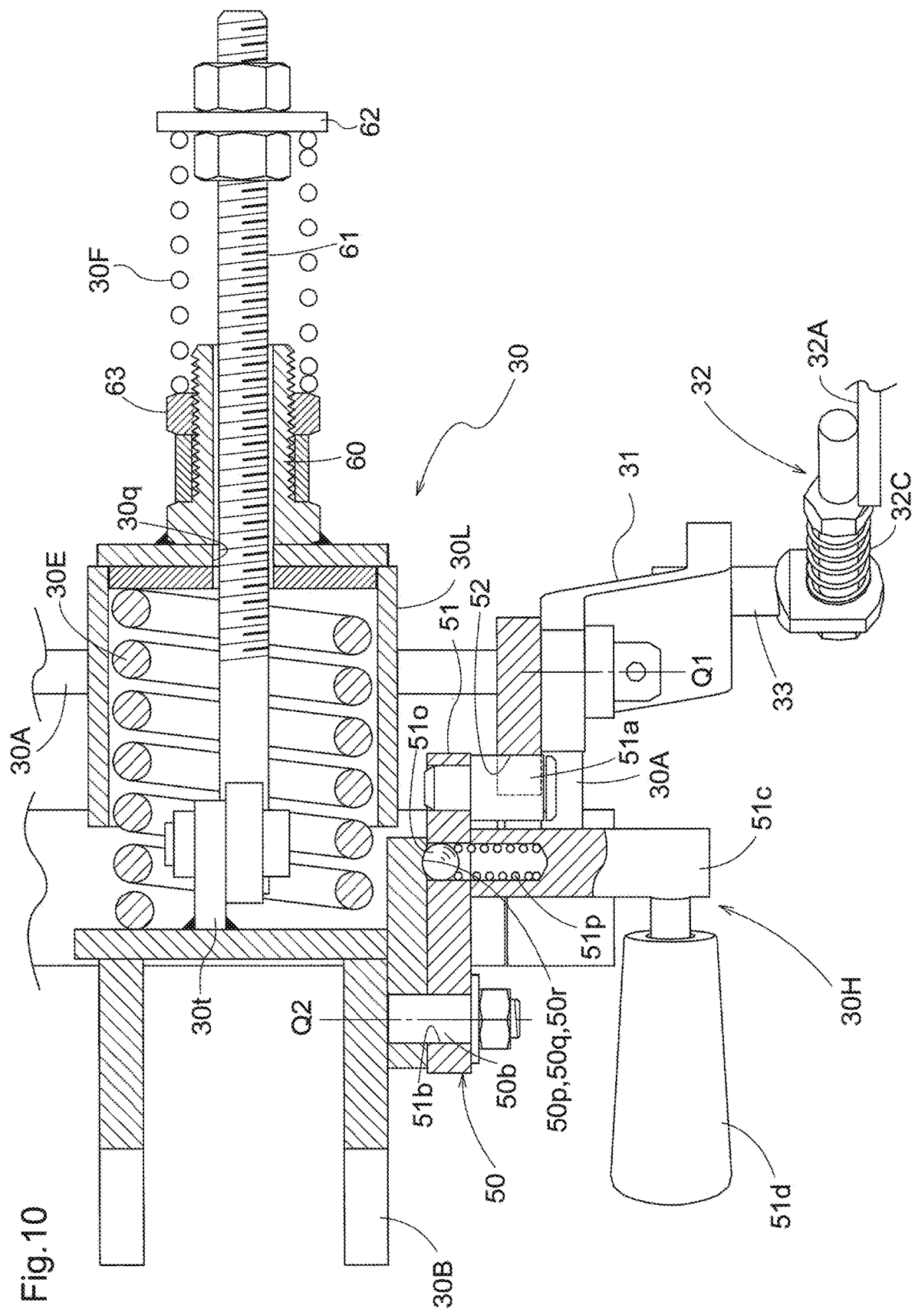
FIG. 10 is a cross-sectional plan view showing the swing member (the first part), the locking part (the second part), a first coil spring, and a second coil spring.

The handle arm 51c preferably has a cylindrical shape, for example. As shown in FIG. 10, a cylindrical hole is located in the handle arm 51c in the lengthwise direction of the handle arm 51c, and the ball 51o and the coil spring member 51p for the detent mechanism are inserted into this cylindrical hole. As shown in FIGS. 9 and 10, the detent recessed portions 50p, 50q, and 50r are provided in three portions of the bracket member 50, the three portions being along the swing trajectory of the handle arm 51c. The ball 51o for the detent mechanism engages with one of the detent recessed portions 50p, 50q, and 50r. If the ball 51o engages with the detent recessed portion 50p, the fitting pin 51a and the first recessed portion 52a are able to engage with each other. If the ball 51o engages with the detent recessed portion 50q, the fitting pin 51a and the second recessed portion 52b are able to engage with each other. If the ball 51o engages with the detent recessed portion 50r, the fitting pin 51a and the third recessed portion 52c are able to engage with each other. In this way, the swing member 51 is able to swing upward and downward according to three levels.

The positioning mechanism according to the present preferred embodiment is able to position the swing member 51 at an angle that is orthogonal to the swing angle of the load receiving section 30. If the ball 51o engages with the detent recessed portion 50q, the straight line passing through the swing axis P and the swing axis Q2 and the straight line passing through the center point of the fitting pin 51a in the side view of the machine body and the swing axis Q2 are orthogonal or substantially orthogonal to each other (see FIG. 12). That is to say, the angle at which the swing member 51 is positioned (the swing angle of the swing member 51 positioned by the positioning mechanism) includes an angle that is orthogonal to the swing angle of the load receiving section 30. The detent recessed portion 50p and the detent recessed portion 50r are located upward and downward of the detent recessed portion 50q, respectively. Therefore, the swing member 51 is able to reliably receive the reaction force from the locking part 52.

When the pressing force does not act on the receiving member 30B, the receiving member 30B comes to rest at the rearmost end of the front-rear swing range that is based on the front-rear length of the elongated hole 30p. At this time, the interlocking swing arm 31 abuts against the abutting bolt 30k of the receiving member 30B, and is separated from the swing member 51. Therefore, when the pressing force does not act on the receiving member 30B, the operator can easily perform an operation to switch the swing member 51 to the above-described three levels.

As described above, in response to the receiving member 30B swinging forward, at first, the interlocking swing arm 31 swings due to the abutting bolt 30k and the interlocking swing arm 31 abutting against each other. The receiving member 30B swings about the swing axis P, and the interlocking swing arm 31 swings about the swing axis Q1. The separation distance between the swing member 51 and the swing axis P is longer than the separation distances between the swing axis Q1 and each of the first recessed portion 52a, the second recessed portion 52b, and the third recessed portion 52c. Therefore, when the receiving member 30B swings forward in the state where the abutting bolt 30k and the interlocking swing arm 31 abut against each other, the amounts of displacement of the first recessed portion 52a, the second recessed portion 52b, and the third recessed portion 52c are smaller than the amount of displacement of the swing member 51. Therefore, in response to the receiving member 30B swinging forward in a state where the abutting bolt 30k and the interlocking swing arm 31 abut against each other, the fitting pin 51a approaches the first recessed portion 52a, the second recessed portion 52b, and the third recessed portion 52c. Thereafter, when the fitting pin 51a abuts against one of the first recessed portion 52a, the second recessed portion 52b, and the third recessed portion 52c, the abutting bolt 30k and the interlocking swing arm 31 separate from each other.

Figure 11:
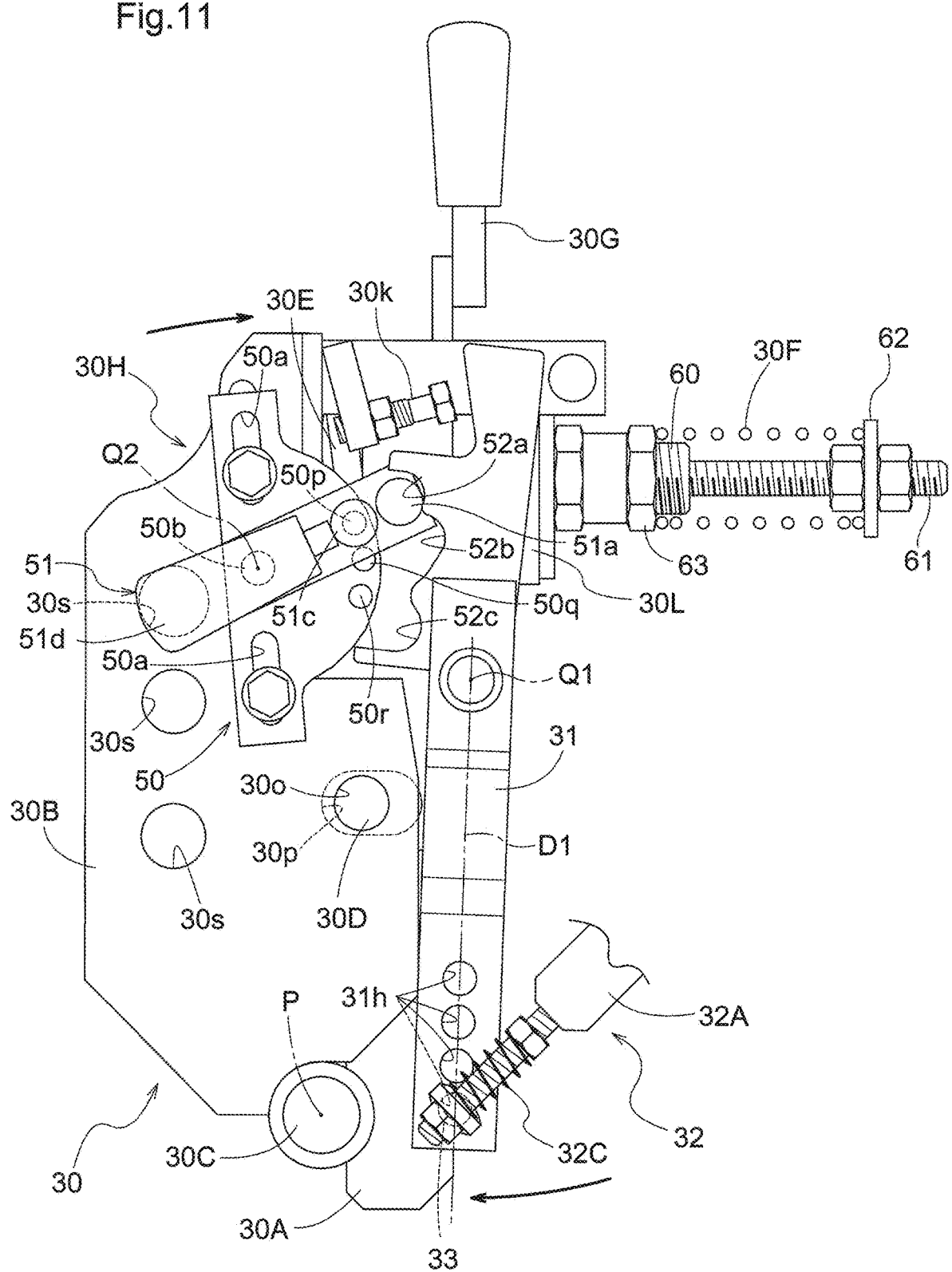
FIG. 11 is a right side view showing swing of the load receiving section and the interlocking swing mechanism.
Figure 12:
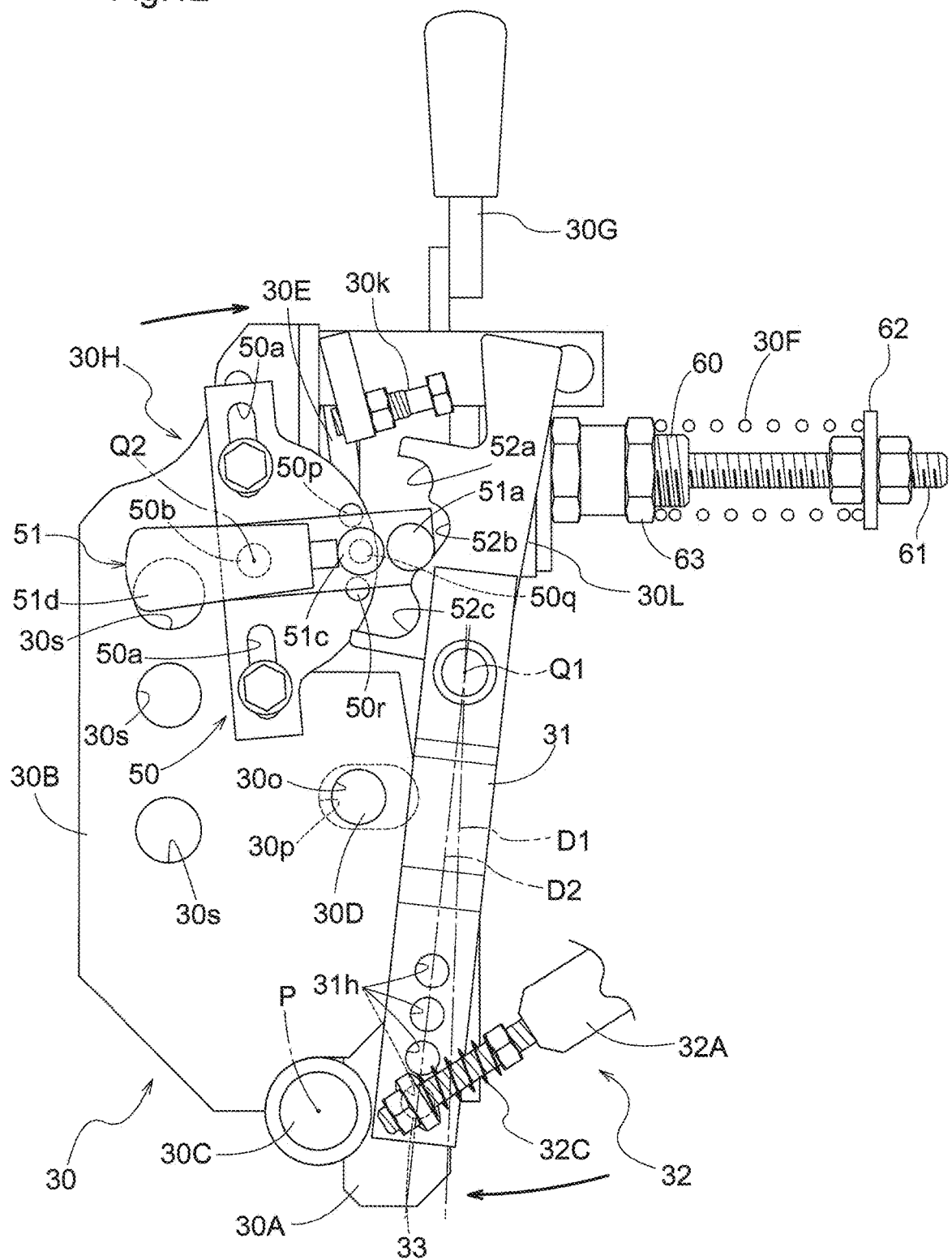
FIG. 12 is a right side view showing the swing of the load receiving section and the interlocking swing mechanism.
Figure 13:
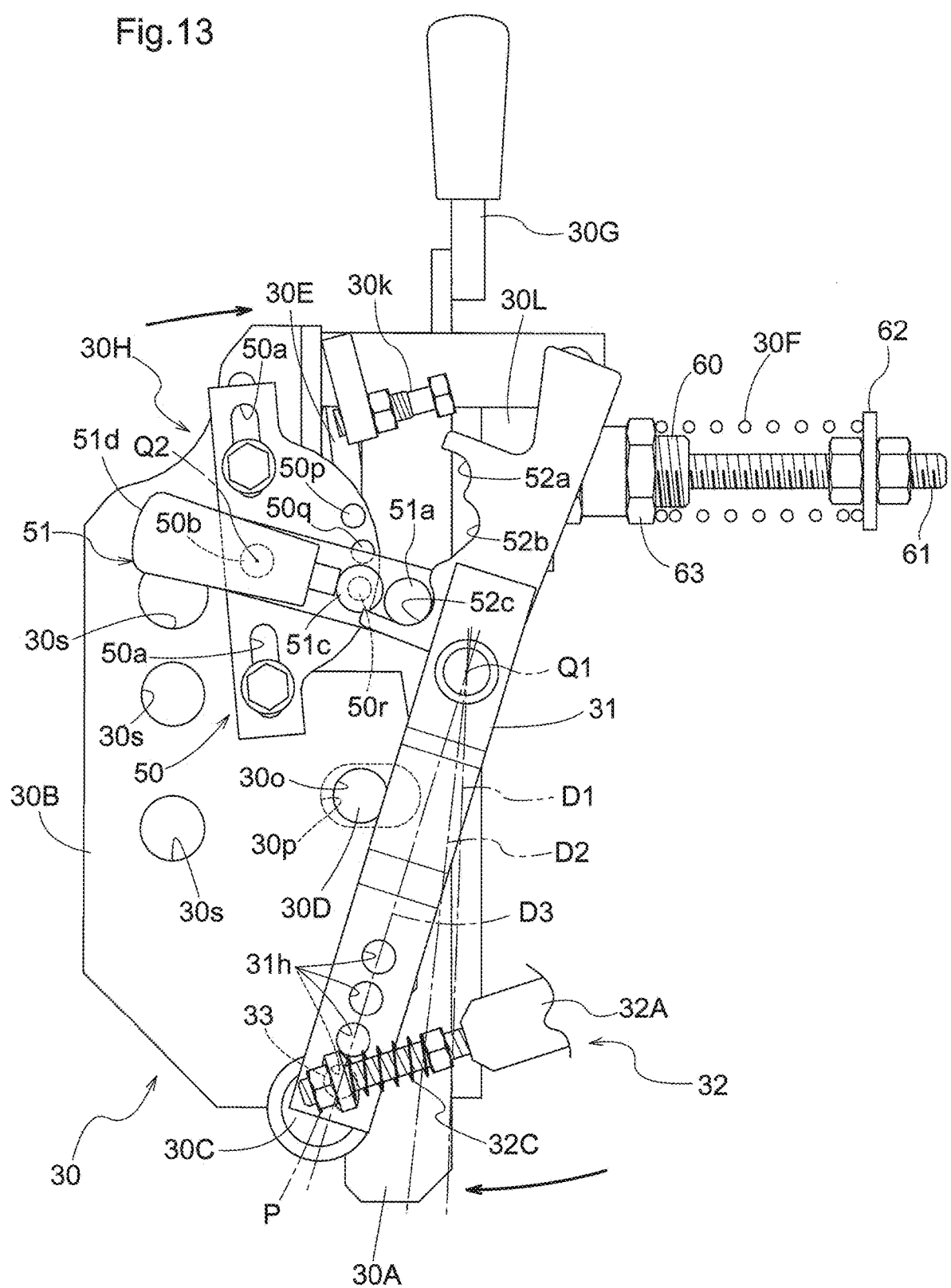
FIG. 13 is a right side view showing the swing of the load receiving section and the interlocking swing mechanism.

As shown in FIGS. 11 to 13, if the abutting point of the swing member 51 and the interlocking swing arm 31 is set to a different point from among the first recessed portion 52a, the second recessed portion 52b, and the third recessed portion 52c, the amount of swing of the interlocking swing arm 31 varies even if the amount of swing of the receiving member 30B is the same. FIG. 11 shows an abutting state of the fitting pin 51a and the first recessed portion 52a. FIG. 12 shows an abutting state of the fitting pin 51a and the second recessed portion 52b. FIG. 13 shows an abutting state of the fitting pin 51a and the third recessed portion 52c. In any of FIGS. 11 to 13, the swing prohibiting member 30G has been operated so as to be in a state where the swing prohibiting member 30G does not restrict the receiving member 30B from swinging.

The second recessed portion 52b is closer to the swing axis Q1 than the first recessed portion 52a is. Therefore, as shown in FIG. 12, the amount of swing (indicated by D2) of the interlocking swing arm 31 when the fitting pin 51a and the second recessed portion 52b abut against each other is larger than the amount of swing (indicated by D1) of the interlocking swing arm 31 when the fitting pin 51a and the first recessed portion 52a abut against each other. Therefore, when the fitting pin 51a and the second recessed portion 52b abut against each other, the top link 13 swings upward and downward by a larger degree than when the fitting pin 51a and the first recessed portion 52a abut against each other.

The third recessed portion 52c is closer to the swing axis Q1 than the second recessed portion 52b is. Therefore, as shown in FIG. 13, the amount of swing (indicated by D3) of the interlocking swing arm 31 when the fitting pin 51a and the third recessed portion 52c abut against each other is larger than the amount of swing (indicated by D2) of the interlocking swing arm 31 when the fitting pin 51a and the second recessed portion 52b abut against each other. Therefore, when the fitting pin 51a and the third recessed portion 52c abut against each other, the top link 13 swings upward and downward by a larger degree than when the fitting pin 51a and the second recessed portion 52b abut against each other. In this way, the more the front-rear swing of the receiving member 30B is amplified, the larger the degree by which the lift arms 16 swings upward and downward is.

Also, the angular velocity and the angular acceleration of the interlocking swing arm 31 when swinging also change in proportion to the change in the amount of swing of the interlocking swing arm 31. That is to say, the angular velocity and angular acceleration of the interlocking swing arm 31 when the fitting pin 51a and the second recessed portion 52b abut against each other are higher than the angular velocity and angular acceleration of the interlocking swing arm 31 when the fitting pin 51a and the first recessed portion 52a abut against each other. Also, the angular velocity and angular acceleration of the interlocking swing arm 31 when the fitting pin 51a and the third recessed portion 52c abut against each other are higher than the angular velocity and angular acceleration of the interlocking swing arm 31 when the fitting pin 51a and the second recessed portion 52b abut against each other. The higher the angular velocity and angular acceleration of the interlocking swing arm 31 are, the higher the angular velocity and angular acceleration of the tillage depth adjustment cam 34 and the interlocking swing part 35 when swinging. As the angular velocity and angular acceleration of the interlocking swing part 35 increase, the velocity and acceleration of the linkage rod 36 when being displaced increase as well, so that the spool to control the supply and discharge of hydraulic oil is also operated at high speed. If the spool is operated at high speed, the operation of the hydraulic actuator for the lift arms 16 becomes agile, so that the responsiveness of the lift arms 16 increases and the angular velocity of the lift arms 16 when swinging increases. That is to say, the more the front-rear swing of the receiving member 30B is amplified by the interlocking swing arm 31, the higher the angular velocity and angular acceleration of the lift arms 16 when swinging are.

In this way, the link ratio between the receiving member 30B and the interlocking swing arm 31 can be changed by changing the abutting point of the swing member 51 and the locking part 52. Also, in the present preferred embodiment, four insertion holes 31h are located in the lower end portion of the interlocking swing arm 31, and three insertion holes 35h are located in the free end portion of the interlocking swing part 35. The insertion holes 31h are equivalent to the "link ratio adjuster". The insertion holes 35h are equivalent to the "link ratio adjuster" as well.

One of the four insertion holes 31h is selected, and the pin member 33 is inserted into this insertion hole 31h. If a different insertion hole 31h is selected, the amount of displacement of the coupling link part 32 changes. A lower insertion hole 31h displaces the coupling link part 32 by a larger amount. That is to say, the link ratio between the interlocking swing arm 31 and the coupling link part 32 is configured to be changeable by the insertion holes 31h at four positions. Here, the rate of change in the link ratio between the receiving member 30B and the interlocking swing arm 31 when the abutting point of the swing member 51 and the locking part 52 is changed to the upper and lower adjacent points in response to the operator performing an operation to switching the swing member 51 is defined as a first link ratio change rate. The rate of change in the link ratio between the interlocking swing arm 31 and the coupling link part 32 when the insertion hole, of the four insertion holes 31h, for connection with the coupling link part 32 is changed to the adjacent insertion hole 31h is defined as a second link ratio change rate. The second link ratio change rate is smaller than the first link ratio change rate.

One of the three insertion holes 35h are selected, and a rear end portion of the linkage rod 36 is pivotally coupled to this insertion hole 35h with a pin. If a different insertion hole 35h is selected, the amount of displacement of the linkage rod 36 changes. An insertion hole 31h closer to the free end portion displaces the linkage rod 36 by a larger amount. That is to say, the link ratio between the interlocking swing part 35 and the linkage rod 36 is configured to be changeable by the insertion holes 35h at three positions. Here, the rate of change in the link ratio between the interlocking swing part 35 and the linkage rod 36 when the insertion hole, of the three insertion holes 35h, for connection with the linkage rod 36 is changed to the adjacent insertion hole 35h is defined as a third link ratio change rate. The third link ratio change rate is smaller than the above-described first link ratio change rate.

That is to say, the insertion holes 31h and 35h are provided downstream of the interlocking swing arm 31 in the link mechanism, as a link ratio changing section that changes the link ratio to a link ratio change rate that is smaller than the link ratio change rate of the swing member 51 and the locking part 52.

As shown in FIG. 10, the second coil spring 30F is provided on the side opposite to the side where the first coil spring 30E is located, with respect to the bracket 30A. The following describes a structure for attaching the second coil spring 30F.

The housing cylinder 30L is provided in an upper portion of the bracket 30A, and the first coil spring 30E is housed in the housing cylinder 30L. A through hole 30q that extends in a front-rear direction is located in a central portion of a front portion of the housing cylinder 30L in radial direction. In addition, a hollow boss member 60 is coupled to a front portion of the housing cylinder 30L. A thread groove is formed on the outer circumferential surface of a front portion of the boss member 60, and a nut 63 engages with this thread groove. Note that a spacer is provided between a rear end portion of the boss member 60 and the nut 63, and this spacer may include a plurality of washers (flat washers or spring washers). The nut 63 protrudes to a position that is forward of the bracket 30A, and the position of the nut 63 is adjusted by the spacer. That is to say, the position of the nut 63 in a front-rear direction may be adjustable according to the length of the second coil spring 30F. Note that the nut 63 and the spacer may be an integrated piece, or the nut 63 may be a double nut, with no spacer being provided. Also, the boss member 60 and the nut 63 may be integrally formed as one member, or the outer circumferential surface of the front portion of the boss member 60 may be configured without a screw groove.

A protrusion 30t that protrudes forward is welded and fixed to a region of the receiving member 30B where the first coil spring 30E abuts, and a rod 61 is pivotally coupled to the protrusion 30t so as to be able to swing upward and downward. The rod 61 penetrates through the space inside the inner periphery of the first coil spring 30E. The rod 61 penetrates through the hollow hole of the boss member 60 fitted into the through hole 30q, and a protruding leading end portion of the rod 61 protrudes to a position that is forward of the bracket 30A.

The second coil spring 30F is fitted onto the rod 61 at a position forward of the bracket 30A with respect to the machine body. A flat washer 62 that has a diameter larger than the outer diameter of the second coil spring 30F is fitted onto an end portion of the rod 61 on the side opposite to the side where the receiving member 30B is located.

A thread groove is formed in a protruding leading end portion of the rod 61. Both sides of the flat washer 62 are fastened with nuts, and the flat washer 62 is sandwiched between the pair of nuts. The position of the flat washer 62 in a front-rear direction may be adjustable according to the length of the second coil spring 30F. Also, the nut 63 has an opposite side diameter larger than the outer diameter of the second coil spring 30F. That is to say, the two end portions of the second coil spring 30F in the extending direction respectively abut against the nut 63 and the flat washer 62. Also, the thread groove of the boss member 60 and the nuts sandwiching the flat washer 62 have an outer diameter that is slightly smaller than the inner diameter of the second coil spring 30F. Therefore, the thread groove of the boss member 60 and the nuts sandwiching the flat washer 62 abut against the inner circumferential surface of the second coil spring 30F without rattling.

As the receiving member 30B swings forward and rearward, the rod 61 is displaced forward and rearward while swinging relative to the receiving member 30B. At this time, as the receiving member 30B swings, the rod 61 is displaced in a top-bottom direction. Therefore, it is necessary to prevent the rod 61 and the inner circumferential surface of the hollow hole of the boss member 60 from interfering with each other. Therefore, the hollow hole of the boss member 60 is formed as to have a diameter that is sufficiently larger than the cross-sectional diameter of the rod 61.

In response to the receiving member 30B swinging forward and rearward, the separation distance between the bracket 30A and the receiving member 30B changes, and the separation distance between the nut 63 supported by the bracket 30A and the flat washer supported by the receiving member 30B with the rod 61 being interposed therebetween changes as well. As a result, the first coil spring 30E expands and contracts. Also, in response to the receiving member 30B swinging forward and rearward, the rod 61 is displaced forward and rearward, the separation distance between the nut 63 and the flat washer 62 changes, and the second coil spring 30F expands and contracts.

As the first coil spring 30E expands and the elastic energy of the first coil spring 30E decreases, the second coil spring 30F contracts and the elastic energy of the second coil spring 30F increases. If the pressing force suddenly stops acting on the receiving member 30B, the elastic energy of the first coil spring 30E is released at once. Therefore, it is conceivable that the receiving member 30B swings abruptly from the state in which the receiving member 30B has swung forward, to the rearmost end of the front-rear swing range thereof that is based on the length of the elongated hole 30p in the front-rear direction. Even in such a case, the second coil spring 30F contracts as the receiving member 30B swings rearward, and the second coil spring 30F stores the elastic energy. Thus, the first coil spring 30E is prevented from abruptly expanding. As a result, the impact when the linkage pin 30D abuts against the rearmost end of the elongated hole 30p is alleviated. In addition, the receiving member 30B is prevented from chattering due to such abutting.

Other Preferred Embodiments

The present invention is not limited to the configuration illustrated in the above-described preferred embodiments, and the following illustrates other typical preferred embodiments of the present invention.

In the above-described preferred embodiments, the load receiving section 30 is provided with the swing member 51 defining and functioning as the "first portion", and the interlocking swing arm 31 is provided with the locking part 52 defining and functioning as the "second portion". However, the present invention is not limited to such preferred embodiments. For example, the load receiving section 30 may be provided with a component that is equivalent to the locking part 52, and the interlocking swing arm 31 may be provided with a component that is equivalent to the swing member 51. That is to say, it is possible that one of the first part and the second part is the swing member 51, and the other of the first part and the second part is the locking part 52 provided with a plurality of recessed portions that can receive and lock the swing member 51.

In the above-described preferred embodiments, the locking part 52 defining and functioning as the "second portion" is configured as a portion of the interlocking swing arm 31. However, the interlocking swing arm 31 and the locking part 52 may be configured as separate members.

In the above-described preferred embodiments, the load receiving section 30 is provided with the swing member 51 defining and functioning as the "first portion". However, the first portion is not necessarily a swingable member, and, for example, the fitting pin 51a may be configured to slide upward and downward. That is to say, it suffices if contact point of the "first portion" and the "second portion" is changeable.

The coupling link part 32 shown in the above-described preferred embodiments includes the first link member 32A, the second link member 32B, the coil spring member 32C, and the conjunction pin 32D. However, the present invention is not limited to such preferred embodiments. For example, the coupling link part 32 may include a chain or a wire. That is to say, it is possible to use a configuration in which a chain or a wire that defines or functions as the coupling link part 32 is pulled by the interlocking swing arm 31 to be tense, and the chain or wire pulls and swings the tillage depth adjustment cam 34. In this preferred embodiment, the chain or wire loosens when the pressing force does not act on the receiving member 30B. Therefore, as in the above-described preferred embodiment, even if the interlocking swing arm 31 swings, the tillage depth adjustment cam 34 does not move in conjunction with the swing of the interlocking swing arm 31.

In the above-described preferred embodiments, the locking part 52 defining and functioning as the "second portion" is provided with three recessed portions (the first recessed portion 52a, the second recessed portion 52b, and the third recessed portion 52c). However, the "plurality of recessed portions" may be two recessed portions, or four or more recessed portions. Alternatively, it is possible to use a configuration in which the locking part 52 is not provided with a recessed portion, and it is possible to use a configuration in which the locking part 52 is provided with a flat surface portion, and the contact point of the swing member 51 and the flat surface portion of the locking part 52 is changeable.

In the above-described preferred embodiment, a pair of upper and lower protruding portions are respectively provided on an upper portion of the first recessed portion 52a and a lower portion of the third recessed portion 52c, and the first recessed portion 52a, the second recessed portion 52b, and the third recessed portion 52c are provided between the pair of upper and lower protruding portions so as to be lined up in a top-bottom direction and define the "common recess". However, the present invention is not limited to such preferred embodiments. For example, it is possible to omit the "common recess", and it is possible to use a configuration in which the upper portion of the first recessed portion 52a and the lower portion of the third recessed portion 52c are not provided with the pair of upper and lower protruding portions, and simply a plurality of recessed portions are lined up in the lengthwise direction of the interlocking swing arm 31. Alternatively, the "common recess" may include one recessed portion corresponding to the swing range of the swing member 51.

In the above-described preferred embodiments, the receiving member 30B swings forward and rearward. However, the receiving member 30B may be configured to swing upward and downward. If this is the case, it is possible to use a configuration in which the interlocking swing arm 31 extends in a front-rear direction with respect to the machine body, and a plurality of recessed portions are lined up in the lengthwise direction of the interlocking swing arm 31.

In the above-described preferred embodiments, four insertion holes 31h are formed in the lower end portion of the interlocking swing arm 31, and three insertion holes 35h are formed in the free end portion of the interlocking swing part 35. However, the present invention is not limited to such preferred embodiments. It is possible to use a configuration in which either an insertion hole 31h or an insertion hole 35h is formed at a plurality of positions, and the other of the insertion hole 31h and the insertion hole 35h is provided at only one position. Also, the number of insertion holes 31h and 35h may be changed as appropriate.

In the above-described preferred embodiments, when the operator switches the swing member 51 to three levels, the fitting pin 51a may abut against the protrusion between the first recessed portion 52a and the second recessed portion 52b or the protrusion between the second recessed portion 52b and the third recessed portion 52c, so that the interlocking swing arm 31 swings slightly. Even in such a case, the first link member 32A and the second link member 32B in the coupling link part 32 swing freely relative to each other and cannot be pulled straight. That is to say, it is possible to use a configuration in which, even if the interlocking swing arm 31 slightly swings due to the swing of the swing member 51 operated by the operator, no movement occurs in conjunction with the swing of the interlocking swing arm 31 due to the allowance made for the coupling link part 32. Also, it is possible to use a configuration in which, when the operator switches the swing member 51 to three levels, the fitting pin 51a does not abut against the protrusion between the first recessed portion 52a and the second recessed portion 52b, or the protrusion between the second recessed portion 52b and the third recessed portion 52c.

It should be noted that the configurations disclosed in the above-described preferred embodiments (including the other preferred embodiments, the same applies hereinafter) can be applied in combination with the configurations disclosed in other preferred embodiments as long as no contradiction arises. In addition, the preferred embodiments disclosed in the present description are examples. Preferred embodiments of the present invention are not limited to these preferred embodiments, and can be appropriately modified without departing from the object of the present invention.

Preferred embodiments of the present invention are applicable to tractors that are each provided with a three-point link mechanism to which a work apparatus is to be attached so as to be able to move upward and downward.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A tractor comprising:
   a three-point link mechanism that is coupled to a rear portion of a vehicle body so as to be able to swing upward and downward, and to which a work apparatus is to be attached so as to be able to move upward and downward;
   a hydraulic drive to perform a swing operation to swing the three-point link mechanism;
   a load receiver to swing in response to a tow load being applied from the work apparatus when the work apparatus performs ground work while being towed by the vehicle body; and
   a link mechanism to transmit an amount of operation for the swing operation to the hydraulic drive according to an amount of swing of the load receiver; wherein
   the link mechanism includes, at a most upstream position, an interlocking swing arm to swing in conjunction with the swing of the load receiver about a swing axis that is different from a swing axis of the load receiver;
   the load receiver is provided with a first portion to press the interlocking swing arm;
   the interlocking swing arm is provided with a second portion contactable with the first portion so as to be pressed by the first portion; and
   a contact position of the first portion and the second portion is changeable.

2. The tractor according to claim 1, wherein
   one of the first portion and the second portion includes a swing;
   the other of the first portion and the second portion includes a lock that is provided with a plurality of recessed portions to receive and lock the swing; and
   the swing is provided with a swing angle determiner to determine a swing angle when the swing is fitted into any of the plurality of recessed portions.

3. The tractor according to claim 2, wherein the swing angle determiner is operable to position the swing at an angle that is orthogonal to a swing angle of the load receiver.

4. The tractor according to claim 2, wherein
   a free end of the swing is provided with a pin to be fitted into any of the plurality of recessed portions;
   the lock is provided with a common recess that includes a plurality of recessed portions so that the plurality of recessed portions are continuously lined up; and
   the pin is movable over the common recess to be fitted into one of the plurality of recessed portions.

5. The tractor according to claim 1, wherein the link mechanism is provided with a sensitivity adjuster to operate such that, as the load receiver swings toward a side where the tow load is larger, an amount of displacement of a mechanism that is located downstream thereof in the link mechanism increases.

6. The tractor according to claim 1, wherein the link mechanism includes, at a position that is downstream of the interlocking swing arm, a link ratio adjuster to change a link ratio so that a link ratio change rate is smaller than a link ratio change rate of the first portion and the second portion.

* * * * *